US012593196B2

(12) United States Patent
Narasimhan et al.

(10) Patent No.: US 12,593,196 B2
(45) Date of Patent: Mar. 31, 2026

(54) METHOD FOR MANAGEMENT OF DEVICE UPDATE TRANSMISSION

(71) Applicant: Axon Enterprise, Inc., Scottsdale, AZ (US)

(72) Inventors: Karthik Narasimhan, Westin, FL (US); David B. Mesri, Paradise Valley, AZ (US); Phu Thanh Bao Tran, Ho Chi Minh (VN); Shlesh Tiwari, Phoenix, AZ (US); Christopher J. Cavage, Bellevue, WA (US); Shane Michael Wilson, London (GB)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 18/760,856

(22) Filed: Jul. 1, 2024

(65) Prior Publication Data

US 2025/0008301 A1     Jan. 2, 2025

Related U.S. Application Data

(60) Provisional application No. 63/524,524, filed on Jun. 30, 2023.

(51) Int. Cl.
 *H04N 7/18*          (2006.01)
 *H04W 4/029*        (2018.01)
(52) U.S. Cl.
 CPC ............ *H04W 4/029* (2018.02); *H04N 7/183* (2013.01)
(58) Field of Classification Search
 USPC ........................................................ 348/158
 See application file for complete search history.

(56) References Cited

U.S. PATENT DOCUMENTS 9,595,193 B1 *   3/2017  Duale .................. G08G 1/0116
9,658,066 B2    5/2017  Yuen et al.
               (Continued)

FOREIGN PATENT DOCUMENTS

KR      10-1714130 B1    3/2017

OTHER PUBLICATIONS

International Searching Authority, International Search Report for International Application No. PCT/US2024/036416 mailed Oct. 17, 2024.

(Continued)

*Primary Examiner* — Nigar Chowdhury
(74) *Attorney, Agent, or Firm* — H S. Malvich, Jr.; Andrew Graham

(57)          ABSTRACT

A field device is configured to determine whether a device update is to be transmitted to a central server. The field device determines a period of time between an update time and a previous update time and a set of device conditions associated with a user utilization of the field device. The field device utilizes at least one of the period of time and the set of device conditions to determine an update schedule for the field device. The update schedule is determined by the field device utilizing a set of internal criteria that the period of time and the set of device conditions are evaluated against. The field device generates a device update from the set of device conditions and the update schedule and transmits the device update to a central server. The field device, via the device update causes the central server to utilize the update schedule.

22 Claims, 7 Drawing Sheets

(56)                References Cited

U.S. PATENT DOCUMENTS

| 10,013,883 | B2 * | 7/2018 | Farnham, IV | ........... | G07C 5/08 |
| 10,390,732 | B2 * | 8/2019 | Ross | ....................... | A61B 90/90 |
| 10,497,232 | B1 * | 12/2019 | Koskan | ................. | H04W 4/022 |
| 10,775,866 | B2 | 9/2020 | Vaccari et al. | | |
| 11,024,137 | B2 * | 6/2021 | Phillips | ........... | G08B 13/19669 |
| 11,785,338 | B1 * | 10/2023 | Guzik | ................... | H04N 23/66 |
| | | | | | 348/222.1 |
| 12,173,992 | B1 * | 12/2024 | Hedeen | ................. | H04N 23/51 |
| 12,332,027 | B2 * | 6/2025 | Basche | ................. | H04N 7/185 |
| 2014/0368601 | A1 * | 12/2014 | deCharms | ............. | H04N 7/148 |
| | | | | | 348/14.02 |
| 2016/0290958 | A1 * | 10/2016 | Ram | ...................... | H10F 55/207 |
| 2017/0122083 | A1 * | 5/2017 | Wilson | ...................... | F42B 3/08 |
| 2017/0214843 | A1 * | 7/2017 | Boykin | .................. | H04N 7/185 |
| 2017/0352123 | A1 * | 12/2017 | Kumar | ................ | G06Q 50/265 |
| 2018/0020147 | A1 * | 1/2018 | Page | ............... | H04N 21/43637 |
| 2018/0053394 | A1 * | 2/2018 | Gersten | ................. | G08B 17/08 |
| 2018/0224559 | A1 * | 8/2018 | Park | ...................... | H04W 4/029 |
| 2018/0314861 | A1 * | 11/2018 | Guzik | ................... | G06F 16/381 |
| 2019/0197369 | A1 * | 6/2019 | Law | ....................... | G06N 3/082 |
| 2019/0373210 | A1 * | 12/2019 | Nguyen | ................. | G06V 20/59 |
| 2021/0259585 | A1 * | 8/2021 | Galagan | ................. | C12Q 1/004 |
| 2021/0358285 | A1 * | 11/2021 | Schorey | ............. | G08B 21/0294 |
| 2021/0360205 | A1 * | 11/2021 | Alakarhu | ............... | H04N 7/188 |
| 2022/0132018 | A1 * | 4/2022 | Allen | ..................... | H04N 7/186 |
| 2022/0345869 | A1 * | 10/2022 | Ahrens | ................. | H04W 4/029 |
| 2022/0375501 | A1 * | 11/2022 | Guzik | .................... | G06N 20/20 |
| 2022/0405514 | A1 * | 12/2022 | Guzik | ................... | G06V 10/25 |
| 2023/0087554 | A1 * | 3/2023 | Guzik | ................... | G08B 25/10 |
| | | | | | 455/456.3 |
| 2023/0094544 | A1 * | 3/2023 | Paripally | ................. | G06F 21/64 |
| | | | | | 713/168 |
| 2023/0394946 | A1 * | 12/2023 | Wells | ................. | G08B 13/1672 |
| 2024/0143645 | A1 * | 5/2024 | Adeel | ..................... | G06F 16/45 |
| 2024/0187326 | A1 * | 6/2024 | Guzik | ................... | H04W 24/08 |
| 2024/0312248 | A1 * | 9/2024 | Park | ...................... | G06T 3/4092 |
| 2024/0356771 | A1 * | 10/2024 | Young | ................. | H04L 65/1069 |

OTHER PUBLICATIONS

'Body-Worn Cameras (BWC)', Philadelphia Police Department, Directive 4.21, Feb. 20, 2023 [Retrieved on Aug. 23, 2024]. Retrieved from <https://www.phillypolice.com/assets/directives/D4. 21BodyWornCameras.pdf>.

* cited by examiner

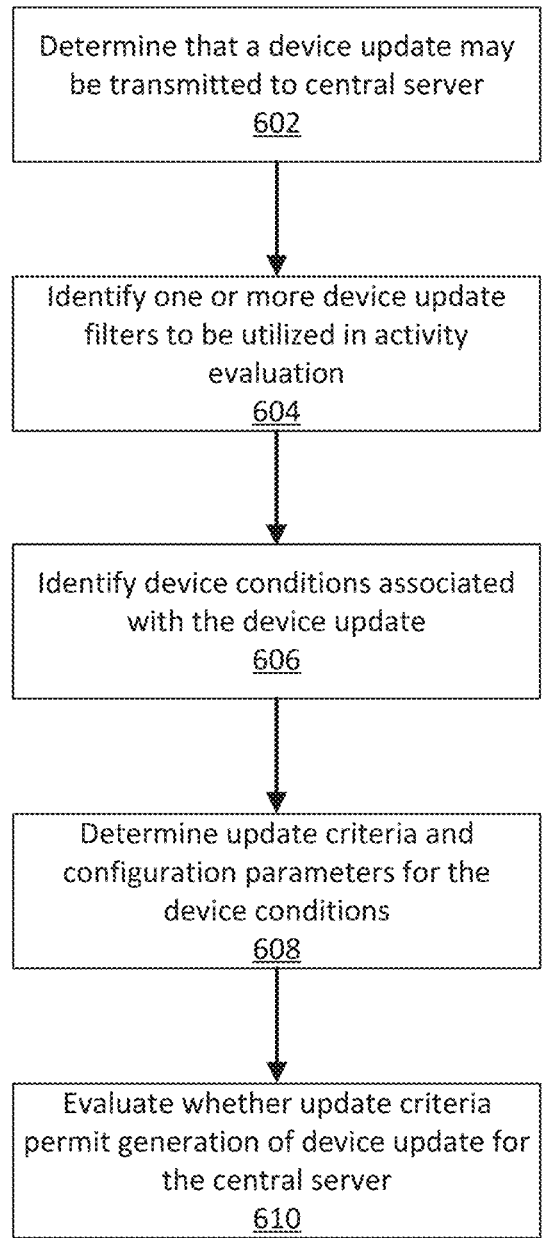

Determine that a device update may
be transmitted to central server
602

Identify one or more device update
filters to be utilized in activity
evaluation
604

Identify device conditions associated
with the device update
606

Determine update criteria and
configuration parameters for the
device conditions
608

Evaluate whether update criteria
permit generation of device update for
the central server
610

METHOD FOR MANAGEMENT OF DEVICE UPDATE TRANSMISSION

CROSS-REFERENCE TO RELATED APPLICATIONS

This application claims the benefit of U.S. Provisional Application 63/524,524 filed Jun. 30, 2023, which is incorporated by reference herein in its entirety.

FIELD OF INVENTION

Embodiments of the present invention relate to managing transmissions between a field device and central server.

BRIEF DESCRIPTION OF THE DRAWING

Embodiments of the present invention will be described with reference to the drawing, wherein like designations denote like elements, and:

FIG. 6 is a flow chart of a method for determining whether a location update is to be generated by an electronic device according to various aspects of the present disclosure.

DETAILED DESCRIPTION

Figure 1:
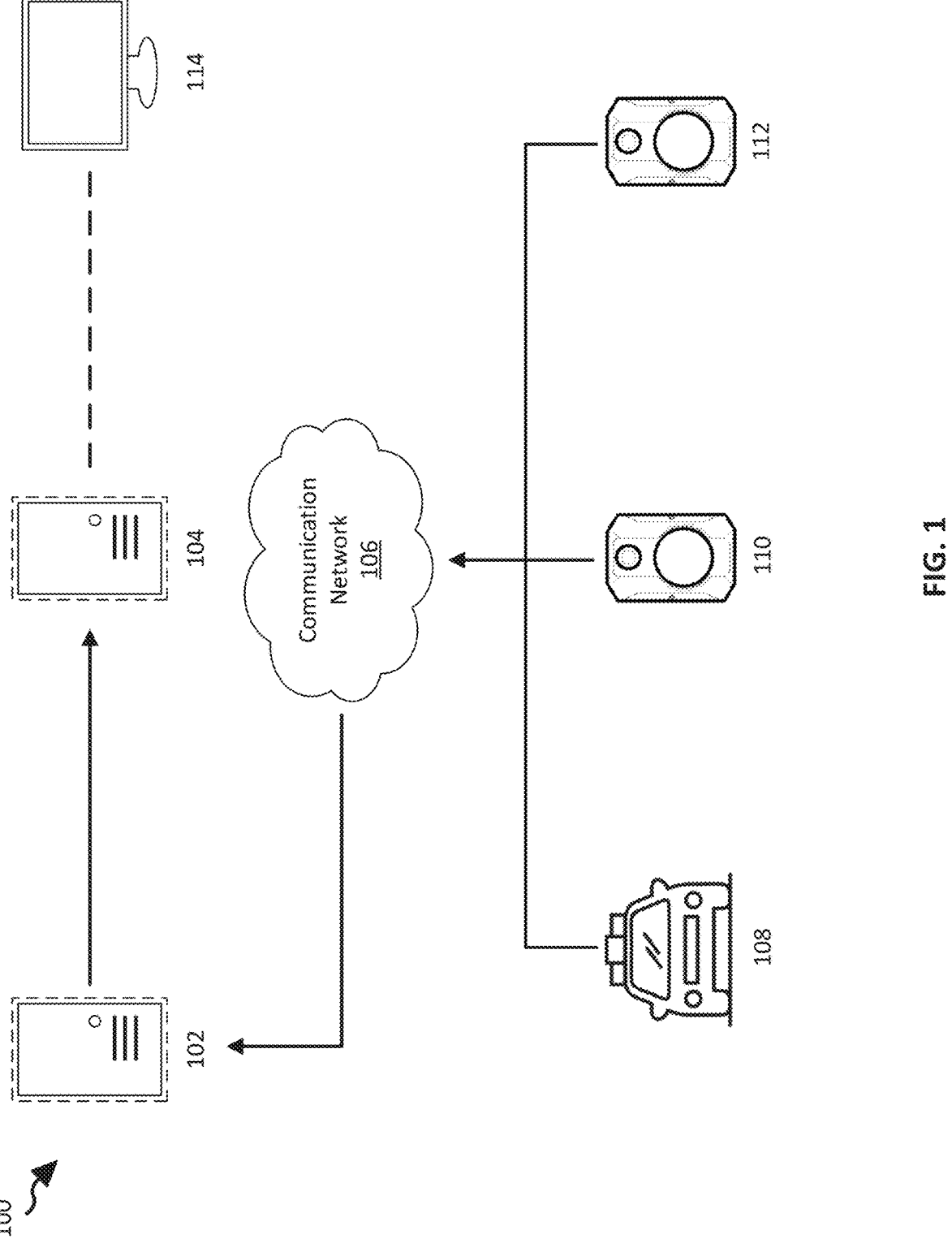
FIG. 1 is a diagram of a system that creates an environment (e.g., ecosystem) for electronic devices to communicate location updates according to various aspects of the present disclosure.

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step.

Also, any reference to attached, fixed, coupled, connected, or the like may include permanent, removable, temporary, partial, full, and/or any other possible attachment option. Surface shading lines may be used throughout the figures to denote different parts but not necessarily to denote the same or different materials.

Various electronic devices are carried by users in the field that benefit from battery life management with the objective of extending operating windows for the electronic devices. Battery life is commonly associated with both user satisfaction and user complaints when utilizing an electronic device. Additionally, devices that utilize communication networks, recording components, and other high power consumption features may benefit from management of those features to extend battery life. For example, while wireless communication features are enabled, electronic devices may utilize more power in the field while transmitting state, location, and other updates to a central server.

Law enforcement officers, for example, may carry several electronic devices that are capable of wireless communication while drawing power from an internal battery such as cameras, sensor equipped holsters, weapons, microphones, etc. The devices may wirelessly communicate with electronic devices in police cars, with other devices carried by law enforcement officers, and with remote data centers. The wireless connectivity provides a pathway for the exchange of information and instructions in situations where the law enforcement officer(s) are otherwise occupied with carrying out various tasks. The flow of information between electronic devices on the law enforcement officers, electronic devices within vehicles, and remote data centers may enable various features that record and preserve information for later review. However, while the high energy consumption features offer benefits in efficiency, accuracy, and comprehensiveness during active periods, there are also inactive periods where these features consume battery life without providing the above benefits. A system and method for managing the high energy consumption features of electronic devices, as described herein, may reduce the consumption of battery during inactive periods and preserve battery for active periods.

A system for managing high energy consumption features of electronic devices may reduce frequency of device recharging and/or extend field time for a user of the electronic devices. While electronic devices may receive periodic recharging, the system may be configured to enable the electronic devices to operate for entire shift(s), on-duty hours, assignments, and/or other periods of time without depleting an internal battery.

Systems, methods, and/or apparatuses may be utilized to provide a variety of data tracking, collecting, recording, communicating, and/or managing features. Generally, electronic devices are configured to provide a set of data management features for various individuals. The term electronic device as used herein may refer to a physical apparatus or system that incorporates various electronic components and utilizes the electronic components to perform various functions. The various functions may be performed via manipulation of electrical signals and/or circuits. Alternatively, or in addition, the various functions may be performed by one or more analog components configured to accomplish the various functions. The electronic device(s) may encompass a wide range of devices, including but not limited to consumer electronics, communication devices, computing devices, body-worn cameras, signaling devices, monitoring devices, CEWs, medical devices, or any other device that relies on electronic circuitry for operation.

Generally, electronic devices may comprise one or more electronic circuits or subsystems that enable the processing, transmission, storage, or conversion of electronic signals. These circuits may include integrated circuits, discrete components, microprocessors, microcontrollers, digital logic circuits, analog circuits, or a combination thereof. Additionally, the electronic device(s) may feature input interfaces, such as buttons, keyboards, touchscreens, sensors, or any other mechanism that allows users to provide input or interact with the electronic device(s) and/or features of the electronic device(s). Similarly, the electronic device(s) may also include output interfaces, such as displays, speakers, actuators, or other mechanisms that present information, generate responses, and/or transmit signals to users and/or external systems. Further, the electronic device(s) may include power supplies, power sources, and/or other power modules that provide the electrical power during operation. Power modules may include batteries, power adapters, capacitors, or any other means of supplying electrical energy.

In various embodiments, an electronic circuit of the electronic device may be configured as a processing circuit that comprises any circuitry and/or electrical/electronic subsystem for performing a function of the electronic device. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may have a low power state in which only a portion of its circuits operate and/or it performs only certain function. A processing circuit may be switched (e.g., awoken) from a low power state to a higher power state in which more or all of its circuits operate, it performs additional certain functions, and/or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

In various embodiments, an electronic circuit of the electronic device may be configured as a communication circuit that transmits and/or receives information (e.g., data). A communication circuit may transmit and/or receive (e.g., communicate) information via a wired and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, Wireless Access Protocol ("WAP"), WiFi, Near Field Communication ("NFC"), Infrared Data Association ("IrDA"), Long Term Evolution ("LTE"), Bluetooth Low Energy ("BLE"), EDGE, Evolution-Data Optimized ("EV-DO"), BodyLAN, ANT+) and/or wired (e.g., USB, RS-232, Firewire, Ethernet) communication protocols.

A communication circuit may receive information from a processing circuit for transmission. A communication circuit may provide received information to a processing circuit. A communication circuit in one device (e.g., body worn camera, vehicle, hub, etc.) may communicate with a communication circuit in another device. Communications between two devices may permit the two devices to cooperate in performing a function of either device. A communication circuit may enable intermittent, continuous, seamless, responsive, periodic, aperiodic, and/or other data transfer methodologies to provide access to captured recordings.

Electronic devices may incorporate memory components, such as volatile or nonvolatile memory devices, for storing data, instructions, firmware, or software programs. These memory components may comprise any hardware, software, and/or database component capable of storing and maintaining data via temporary and/or persistent storage. For example, a memory unit may comprise any suitable non-transitory memory known in the art, such as, an internal memory (e.g., random access memory (RAM), read-only memory (ROM), solid state drive (SSD), etc.), removable memory (e.g., an SD card, an XD card, a CompactFlash card, etc.), or the like. It should be understood that the term electronic device may reference various forms and configurations, including standalone devices, integrated systems, embedded systems, wearable devices, portable devices, or any other apparatus that utilizes electronic circuitry to perform its intended functions. Accordingly, various embodiments of electronic devices may include integration of electronic components and technologies that provide capabilities for data processing, information exchange, and/or other desired functionalities.

A communication network may be configured to provide transmission and/or reception capabilities for managing information via wired and/or wireless communication paths for communication circuit(s) associated with various electronic devices. A communication circuit may be configured as a network interface that enables a system or an electronic device to communicate with other devices and/or systems over the communication network. The network interface may enable processes performed by processing circuits, logic embedded in hardware, software instructions executable by the processing circuit(s), or any combination thereof to interact with one or more electronic devices via the communication network. The functions performed by a network interface, whether using hardware or software executed by a processor, may be referred to as services. A device may request the services of a communication interface to communicate with an electronic device. A network may include one or more network technologies (e.g., internet, local area network ("LAN"), wide area network ("WAN"), metropolitan area network ("MAN")).

In various embodiments, the electronic device(s) may comprise a communication interface, a communications component, a communication circuit, and/or other communication units. A communication unit as described herein may comprise any suitable hardware and/or software components capable of enabling the transmission and/or reception of data. A communications unit may enable electronic communications between devices and systems. A communications unit may enable communications over the communication network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., Fire Wire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Electronic communications between the systems and devices may be unsecure. The communication network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, the electronic device(s) may be configured as body worn cameras that are utilized by law enforcement officers, emergency responders, field agents, and/or other individuals. For example, a body worn camera may refer to a portable electronic device designed to be worn or attached to the body of a user or an object (e.g., a vehicle, a drone, a vest, a harness, a bicycle, a motorcycle, a horse, and/or other object) to capture, record, and/or otherwise preserve audio information, visual information, and/or a combination of audio and visual information. The body worn camera may incorporate various components, features, and/or functionalities to enable the capture, storage, transmission, and/or retrieval of audio and video recordings. Generally, a body worn camera may comprise a housing that may be configured as a lightweight, durable, protective, and/or ergonomic enclosure to partially and/or fully contains one or more internal components of the body worn camera. The housing may also include mounting mechanisms or accessories to facilitate secure attachment to different parts of the body of the user and/or other objects suitable for attachment of the body worn camera.

Generally, a body worn camera may comprise one or more of an image sensor, a lens system, a microphone, a transmitter, a processing circuit, a memory component, and/or other components for capturing, recording, transmitting, storing, and/or managing audio/visual data. The image sensor, such as a CMOS or CCD sensor, may capture visual information in the form of analog images, digital images, and/or video frames. The lens system, comprising one or more lenses, may be configured to focus light onto the image sensor to capture visual information. Audio capturing capabilities, such as the microphone, may capture audio information such as sounds and/or voices in parallel with and/or independent from visual information. The memory component of the body worn camera may provide data storage capabilities, typically in the form of internal memory or removable storage media. The memory allows for the temporary or permanent storage of recorded audio/visual data for access and review at a later time. Removable storage media may include memory cards or other portable storage devices.

The body worn camera may comprise one or more control components that facilitate user interaction such as control buttons, switches, and/or touch-sensitive surfaces. Similarly, the body worn camera may comprise screens, speakers, and/or other user interfaces for providing and/or collecting information from users of the device. The control components and/or user interfaces may enable a user to control functions of the body worn camera such as powering the device on or off, initiating recording, adjusting settings, and/or activating specific features.

In addition to the above capabilities, a body worn camera may incorporate additional features or functionalities, such as image stabilization, low-light performance, GPS tracking, timestamps, encryption capabilities, or integration with other devices or systems. These features may enhance the effectiveness, reliability, and usability of the body worn camera in various applications, including law enforcement, security, personal recording, sports activities, journalism, or any other scenario that requires capturing firsthand visual and/or audio information. It should be understood that body worn cameras encompasses various form factors, designs, and configurations, including but not limited to cameras integrated into wearable accessories, clothing items, head-mounted devices, mobile telephones, and/or any other device that may be worn or attached to the body for audio/visual data recording purposes.

A user of the systems, methods, and/or apparatuses discussed herein may be a police officer (e.g., law enforcement official, detective, sheriff, deputy, agent, official), a member of the armed forces (e.g., member of the military, soldier, warfighter, military police, national guardsman) and/or any person, or a mix of people (e.g., police officers, military personnel, civilian), carrying electronic devices with the ability to capture audio/visual data.

A central server, as used herein, includes any conventional hardware and software that implements a network node that communicates via a LAN and/or a WAN with electronic devices. A server may include capability to forward messages between networks. In an implementation, the server includes conventional computer systems of a data center for communicating with a relatively large number of electronic devices (e.g., 20 to 20,000).

In various embodiments, electronic device(s) and/or body worn cameras may be configured to communicate with the central server. As noted above, the central server may be configured to transmit information with and/or between various devices via a communications network. The central server may operate as a network hub that manages and fulfills requests from client devices, facilitates communication and storage, and/or delivers requested information or services. The central server may comprise hardware components, software programs, and associated peripherals that provide features and functionality associated with the central server. The central server may comprise a central processing unit (CPU), one or more memory components, one or more network interfaces, and/or input/output interfaces. Additionally, the central server may comprise software that provides a set of features and/or functionality to electronic devices associated with the central server. The features and functionality provided by the central server may comprises process management, resource allocation, data storage management, network protocols, security mechanisms, device management options, and application programming interfaces (APIs) to enable integration with other software or client applications.

The central server may be part of a larger server infrastructure, including multiple interconnected servers forming a server cluster or a distributed computing system. This infrastructure enables scalability, load balancing, fault tolerance, and high availability of services by distributing the workload among multiple server instances or nodes. It should be understood that the central server may encompass different configurations, sizes, and types, including but not limited to rack-mounted servers, blade servers, tower servers, modular servers, virtual servers, cloud servers, or any other system designed to provide resources and services in a networked environment.

A vehicle may include electronic devices (e.g., mobile data terminal ("MDT"), camera, computer, radio, microphone, sensors, navigation system, weapons) that can communicate directly with electronic devices carried by a user and/or the central server. A vehicle's electronic devices may communicate with a user's electronic devices through an access point (e.g., signal unit, hub, data concentrator). A vehicle may include any machine for transporting people (e.g., automobile, car, bus, truck, van). A vehicle may include machines for providing transportation for specific purposes (e.g., police car, squad car, cruiser, mobile patrol, armored vehicle, etc.). A vehicle may be controlled autonomously (e.g., without a driver). A vehicle may be controlled remotely (e.g., drone, unmanned aerial system, etc.).

In various embodiments, an electronic device and/or a central server may comprise an amount of memory. The amount of memory may comprise any hardware, software, and/or database component capable of storing and maintaining data. For example, memory may refer to and/or comprise a database, data structure, memory component, or the like. Additionally, memory may refer to and/or comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, and with reference to FIG. 1, a device management system 100 is disclosed. Device management system 100 may be similar to, or have similar aspects and/or components with, any device management system discussed herein. Device management system 100 may comprise a central server 102 (e.g., a state management server 102) and one or more system services 104. Additionally, device management system 100 may comprise a communication network 106 that enables the central server 102 to transmit one or more system requests to and receive one or more device updates from various field devices. The field devices can include a vehicle-mounted device 108, a first user device 110, a second user device 112, and/or various additional devices.

Device management system 100 may be configured to enable device data to be received by the central server 102, enable the central server 102 to manage device state associated with the various field devices, and enable the various field devices to evaluate internal criteria for communications with the central server 102. For example, the device management system 100 may provide a framework for the central server 102 to receive device data that comprises device activity indicators, device updates, information packets associated with field events, and/or additional data generated by the various field devices. Additionally, the device management system 100 may provide the framework to enable the central server 102 to identify a current state for the various field devices and utilize the current state to manage the various field devices. Further, the device management system 100 may enable the various field devices to manage an update schedule and one or more update transmissions from the various field devices to the central server 102.

Central server 102 may be configured to transmit, receive, and/or manage communications associated with the various field devices via the communication network 106. In particular, central server 102 may be configured as a state management server 102 that receives and monitors device status for one or more field devices (e.g., vehicle-mounted device 108, first user device 110, second user device 112, etc.). More specifically, the state management server 102 may be configured to monitor the one or more field devices during utilization of the one or more field devices by one or more field users. Additionally, state management server 102 may enable administrative users at a central location (e.g., a precinct, a command center, an administrative facility, an office, etc.) to receive information from the one or more field devices, communicate with the one or more field users (e.g., law enforcement officers, agents, workers, civilians, etc.), and/or determine availability of individual users. Accordingly, the state management server 102 may function as an organizational hub where information from field devices may be collected, recorded, archived, managed, analyzed, and/or otherwise utilized.

State management server 102 may be communicatively coupled with one or more system services 104. The system services 104 may include database services, live streaming services, data storage and/or archiving services, user management services, communication services, and/or other services for managing devices and users within the system 100. Additionally, the one or more system services 104 may be configured to interact with the one or more field devices depending at least on a current activity associated with a field device, whether a field device is assigned to a task, whether a field device is available for assignment, and/or other device state indicators associated with the one or more field devices by the state management server 102. For example, a live streaming service of the one or more system services 104 may be configured to enable a user to view streamed video and/or audio received from a field device associated with an active event. Alternatively, or in addition, a user management service may be configured to enable an administrative user to assign currently available field devices and associated users to new tasks based on the state management server 102 flagging the currently available field devices.

State management server 102 may further be communicatively connected to the one or more field devices via communication network 106. Communication network 106 may enable substantially real-time communication between state management server 102 and the one or more field devices. Alternatively, or in addition, communication network 106 may enable asynchronous communication between state management server 102 and the one or more field devices.

In various embodiments, state management server 102 may be configured to track, manage, report, and/or modify device states associated with the various field devices. In particular, state management server 102 may be configured to receive one or more device updates associated with the field devices and determine a device state indicated by a device update, a set of device conditions included in the device update, and/or other information associated with utilization of the field device. Additionally, the state management server 102 may be configured to provide the device state, the set of device conditions, and/or the other information associated with utilization of the field device to the one or more system services 104 (e.g., storing in a database, updating a live stream associated with a field device, updating a user interface 114 with the device state and/or set of device conditions, etc.). The state management server 102 may be configured to maintain the device states associated with the one or more field devices based at least on the one or more device updates. For example, the state management server 102 may maintain the device state to comprise indications of at least a device assignment, a device location, a device orientation, signal strength information, an active event association, and/or a device availability indication. Alternatively, or in addition, the state management server 102 may maintain the device state to comprise indications of whether a field device is available for display via the user interface 114, a field device identifier, a update schedule associated with device updates received from the field device, recording state, recording availability for review via the user interface 114, live stream availability, and/or field user assignment(s). Further, the state management server 102 may maintain the set of device conditions to comprise one or more indications of a field device location, a field device velocity, a field device signal strength, a field device network, a recording status associated with the field device, a live-stream availability associated with the field device, and/or other information associated with utilization of the field device.

In various embodiments, the one or more field devices can include devices that are monitored by at least state management server 102. For example, vehicle-mounted device 108, first user device 110, and second user device 112 may be configured to transmit a notification, indication, and/or other message to state management server 102 upon activation by a field user. Activation may comprise turning on an associated device that the field device is integrated with (e.g., turning on a vehicle that the vehicle-mounted device 108 is integrated with), turning on an associated device that the field device is paired to (e.g., turning on a personal hub that the first user device 110 is paired with), turning on the field device, interacting with a terminal that assigned the field device to a field user, and/or otherwise indicating that the field device is being utilized by a field user. Additionally, activation of a field device may cause the field device to begin transmitting device updates (e.g., location updates, event updates, recording updates, etc.) to state management server 102. Further, activation of a field device may cause state management server 102 to update a set of internal criteria for determining whether an update is to be transmitted.

In various embodiments, first user device 110 and second user device 112 may be body worn cameras that utilize the set of internal criteria to manage battery utilization to maintain operation. In particular, body worn cameras and other personal devices (e.g., mobile phones, radios, transponders, etc.) carried by field users may be powered by an internal battery that has an operating duration for which it may remain active before being recharged. Various features of the body worn cameras and/or other personal devices may deplete the internal battery more rapidly when active. Commonly, features such as location reporting, data transmission, data streaming, data recording, and other features are associated with depletion of the internal battery. Accordingly, the set of internal criteria can be utilized to manage when battery depleting features are permitted to remain active by the first user device 110 and the second user device 112. Additionally, some field devices may be associated with an external power source that permits continuous, periodic, aperiodic, and/or other forms of consistent utilization for the battery depleting features. For example, vehicle-mounted device 108 may be powered by a vehicle that it is mounted to, permitting the battery depleting features to be utilized by the vehicle-mounted device 108. A second set of internal criteria, with different thresholds and considerations from the set of internal criteria, may be utilized by vehicle-mounted device 108 to manage the battery depleting features.

In various embodiments, a user interface 114 may be configured to display one or more device conditions for viewing by one or more users. In particular, the user interface 114 may be associated with an administrative, command, assignment, dispatch, and/or other management center where the one or more users may view one or more device states associated with the first user device 110, the second user device 112, and/or other field devices. For example, the user interface 114 may obtain and/or receive device information from the system service 104 (e.g., a database) for display via the user interface 114. The device information displayed via the user interface 114 may include a device state associated with the field device. The device information displayed by the user interface 114 may include a map that displays whether a field device associated with an icon enabled, a device identifier associated with the field device, location data of the field device, orientation data of the field device, velocity data associated with the field device, an update schedule of the field device, information logs associated with previous device updates, and/or other device information received and/or determined by the state management server 102. The device information displayed by the user interface 114 may include an indication of field device recording state, an indication of whether field device recording is available, whether the field device livestream is available, and/or other information regarding data recorded by the field device. The device information displayed by user interface 114 may include field device assignments associated with the user currently utilizing the field device.

In various embodiments, user interface 114 may provide a substantially real-time, a continuously updated, and/or a refreshable display of field device state managed by state management server 102. In particular, user interface 114 may display a map, a grid, a table, and/or other interface for summarized and/or displaying field device state associated with one or more field devices that are enabled with, utilized by, and/or otherwise associated with one or more users. Additionally, user interface 114 may be configured to update the field device state displayed as the state management server 102 receives one or more device updates from the one or more field devices and provides device information from the one or more device updates to the system services 104. Accordingly, administrative and/or other users utilizing the user interface 114 may be provided substantially real-time information regarding the field device state of the one or more field devices. Alternatively, or in addition, administrative and/or other users utilizing the user interface 114 may be provided the most recent device information received by the state management server 102 via the device update(s) where substantially real-time information is unavailable.

In various embodiments, the user interface 114 may be configured to display the device state and/or the set of device conditions associated with a field device. In particular, the state management server 102 may receive one or more device updates from the field device and provide the device state and/or the set of device conditions to the one or more system services 104. The user interface 114 may obtain the device state and/or the set of device conditions from the one or more system services 104 and display the device state and/or the set of device conditions. The device state and/or the set of device conditions may be utilized as a current device state and/or a current set of device conditions based at least on the state management server 102 receiving a device update from the field device. The device update may be utilized to maintain the current device state and/or the current set of device conditions until an upcoming device update is received by the state management server 102 from the field device.

Figure 2:
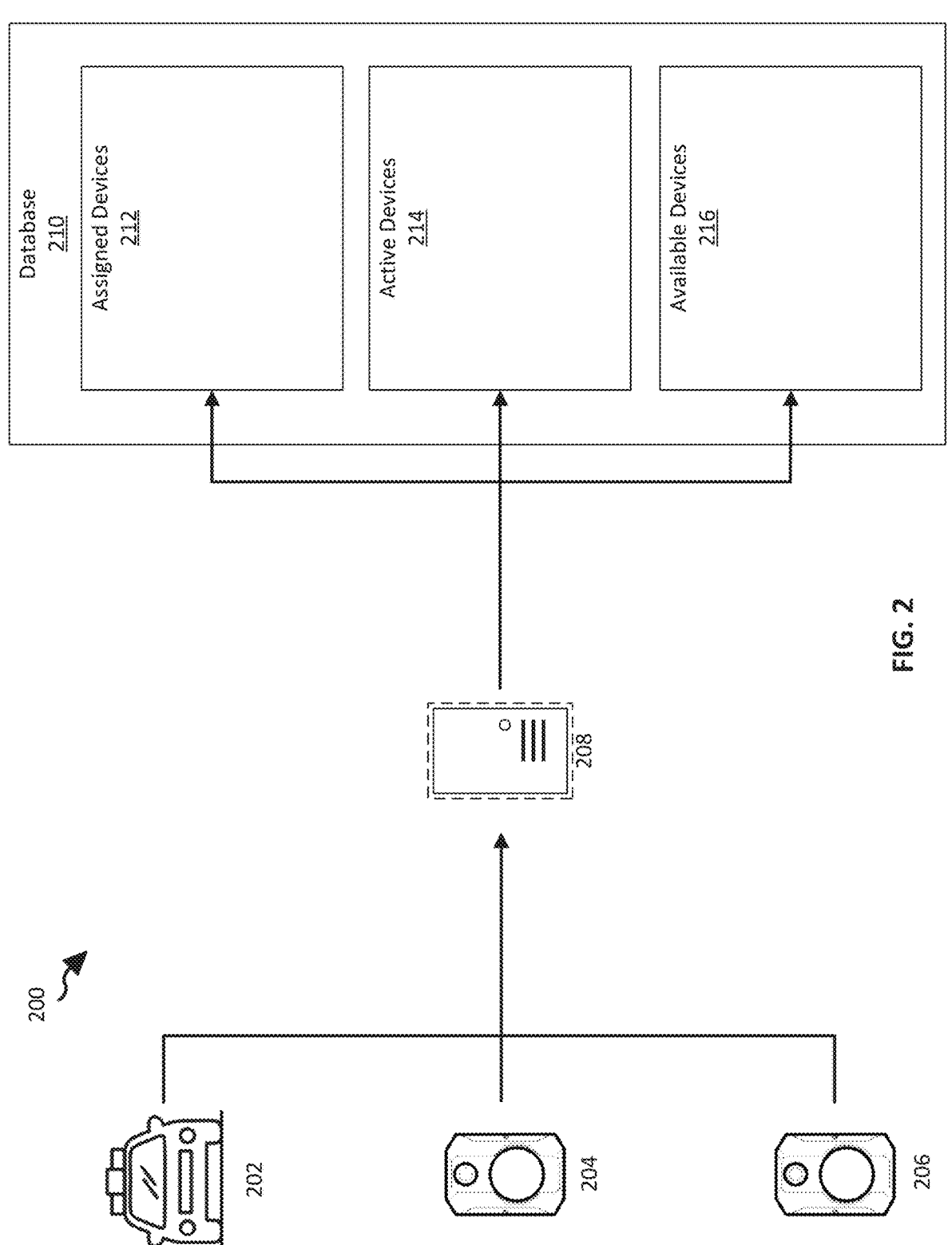
FIG. 2 is a diagram of a system that receives location updates from electronic devices to manage device state for the electronic devices according to various aspects of the present disclosure.

In various embodiments, and with reference to FIG. 2, a state management system 200 is disclosed. State management system 200 may be similar to, or have similar aspects and/or components with, any device management system and/or state management system discussed herein. State management system 200 may receive updates and indications from vehicle-mounted device(s) 202, body worn camera(s) 204, and/or other field devices 206. Updates from vehicle-mounted device 202, body worn camera 204, and field device 206 may be received at state management server 208. Additionally, state management system 200 comprises a database 210 configured to store indications of device state associated with one or more device categories. For example, the database may store indications of assigned devices 212, active devices 214, and available device 216. Additional categories of devices may be generated, managed, and altered by state management server 208.

In various embodiments, vehicle-mounted device 202 may be associated with a first set of internal criteria for managing device updates. In particular, the first set of internal criteria associated with the vehicle-mounted device 202 may be configured to manage updates transmitted from field device(s) associated with an external power source. The first set of internal criteria may be utilized by the vehicle-mounted device 202 to evaluate information to be included in periodic, aperiodic, triggered, and/or otherwise generated updates that are transmitted from the vehicle-mounted device 202 to the state management server 208 (e.g., via communication network 106). Further, the first set of internal criteria may be utilized by the vehicle-mounted device 202 to evaluate transmission opportunities for the device updates transmitted to the state management server 208.

In various embodiments, body worn camera 204 may be associated with a second set of internal criteria for managing device updates. In particular, the second set of internal criteria associated with the body worn camera 204 may be configured to manage updates transmitted from field device (s) associated with an internal power source. The second set of internal criteria may be utilized by body worn camera 204 to evaluate information to be included in periodic, aperiodic, triggered, and/or otherwise generated updates that are transmitted from body worn camera to the state management server 208 (e.g., via communication network 106). Further, the second set of internal criteria may be utilized by body worn camera 204 to evaluate transmission opportunities for the device updates transmitted to the state management server 208. It should be noted that the second set of internal criteria may be configured to manage device updates so that device updates are initiated and/or suppressed to extend operating time for the body worn camera 204.

In various embodiments, field device 206 may be associated with the second set of internal criteria for managing device updates or a third set of internal criteria for managing device updates. More specifically, and depending at least on utilization of field device 206, the state management server 208 may provide field device 206 with internal criteria tailored to the utilization of field device 206. For example, the second set of internal criteria may be configured for a patrol assignment associated with a law enforcement officer. The patrol assignment may be associated with active periods of time where the law enforcement officer is responding to an assigned event, a call, and/or other event that occurs during the patrol assignment. In response, the second set of internal criteria may be tailored to the patrol assignment such that battery power is conserved during inactive periods of time where device updates are transmitted less frequently than active periods of time (e.g., device updates may be transmitted every 30 seconds, 60 seconds, 120 seconds, 300 seconds, 10 minutes, 2 hours, etc. during inactive periods of time and device updates may be transmitted every 1 second, 2 seconds, 5 seconds, 10 seconds, 30 seconds, continuously, etc.). More generally, different assignments associated with field device 206 may be associated with different sets of internal criteria that are tailored to the priorities of individual assignments. Individual sets of internal criteria may be configured to prioritize optimization of battery life, consistency of updates, quality of data recordings, and/or other objectives associated with individual assignments.

In various embodiments, state management server 208 (e.g., central server 102, state management server 102, etc.) may be configured to receive device updates transmitted by vehicle-mounted device 202, body worn camera 204, and/or field device 206. Additionally, state management server 208 may be configured to evaluate the device updates and the information associated with the device updates to track, manage, report, and modify device state associated with the various field devices. For example, state management server 208 may be configured to access sets of internal criteria that are associated with the individual field devices, compare the device updates and update information with the sets of internal criteria, and determine a current device state associated with the individual field devices. Alternatively, or in addition, the state management server 208 may be further associated with a set of state criteria that utilizes the device updates and the update information to evaluate current device state associated with the individual field devices.

In various embodiments, state management server 208 may track, manage, record, report, and/or modify device state indications stored within database 210. As noted above, device states may comprise assigned devices 212, active devices 214, and available devices 216. Additional categories may be added to the indications stored within database 210 (e.g., inactive devices, muted devices, training devices, etc.). Further, individual categories are not mutually exclusive. A field device associated with assigned devices 212 may be also associated with active devices 214 and/or available devices 216. For example, a field user may be assigned to monitor a sporting event such that a field device associated with the field user is considered an assigned device 212. However, due to the low priority nature of monitoring a sporting event, the field device may also be considered an available device 216 that may be reassigned to another event. Additionally, individual categories may have further delineations within the category. As noted above, assigned devices 212 may have different priorities associated with the assignment and available devices 216 may have different priorities regarding the availability of the field device. Alternatively, or in addition, other categories may be utilized to delineate between categories of devices and what actions may be taken with respect to those devices.

In various embodiments, state management server 208 may be configured to associate device state indications within database 210 with individual field devices (e.g., vehicle-mounted device 202, body worn camera 204, field device 206, etc.). Additionally, state management server may be configured to alter associations between device state indications and individual field devices in response to device updates received from the field devices. As noted above, this may be accomplished via various sets of internal criteria associated with the field devices and/or state management server 208. Further, state management server 208 may be utilized by internal users (e.g., administrative users, leadership users, dispatch users, etc.) to update device state indications and transmit assignments to the field devices.

In various embodiments, a field device (e.g., vehicle-mounted device 202, body worn camera 204, field device 206, etc.) may be configured to transmit one or more device updates based at least in part on an update schedule. Additionally, state management server 208 may be configured to receive the one or more device updates based at least on the update schedule. Transmission of the one or more device updates may provide confirmation to the state management server 208 that the field device remains active, functional, and/or otherwise operational. Further, the one or more device updates may contain one or more device conditions that are transmitted to the state management server 208. The one or more device conditions may provide information to the state management server 208 comprising a field device location, a field device velocity, a field device signal strength, a field device network, a recording status associated with the field device, a live-stream availability associated with the field device, and/or other information associated with user utilization of the field device.

In various embodiments, a field device (e.g., vehicle-mounted device 202, body worn camera 204, field device 206, etc.) may be configured to revise, update, modify, and/or otherwise alter an update schedule for transmission of one or more device updates to state management server 208. In particular, the field device may be configured to determine, based at least on a set of internal criteria, whether one or more future updates are to be transmitted on a revised update schedule. In response to determining that the one or more future updates are to be transmitted on a revised update schedule, the field device may transmit a device update that includes the revised update schedule. The device update may be received by the state management server 208 and cause the state management server to incorporate the revised update schedule with the update schedule. Incorporation of the revised update schedule with the update schedule of the state management server 208 may inform the state management server 208 of one or more periods of time between the one or more future updates that are altered by the revised update schedule. Accordingly, the state management server 208 is informed by the revised update schedule of one or more timestamps that the state management server 208 expects to receive the one or more future updates.

In various embodiments, the revised update schedule may further inform the state management server 208 of one or more device updates that may be suppressed by the field device. In particular, the revised update schedule may indicate one or more device updates associated with the update schedule that may be suppressed by the field device. It should be noted that while the one or more updates may be suppressed by the field device as indicated by the revised update schedule, the field device may opt to transmit a device update in place of suppressing the device update if a set of internal criteria indicate the device update should be transmitted. Accordingly, the state management server 208 may be informed that one or more device updates are suppressible and that the device state associated with the previous device update received according to the update schedule (and/or revised update schedule) may be maintained through the suppressed device updates. Additionally, the state management server 208 may update the device state in response to a device update being received from the field device where the revised update schedule indicates that the device update may be suppressed.

Figure 3:
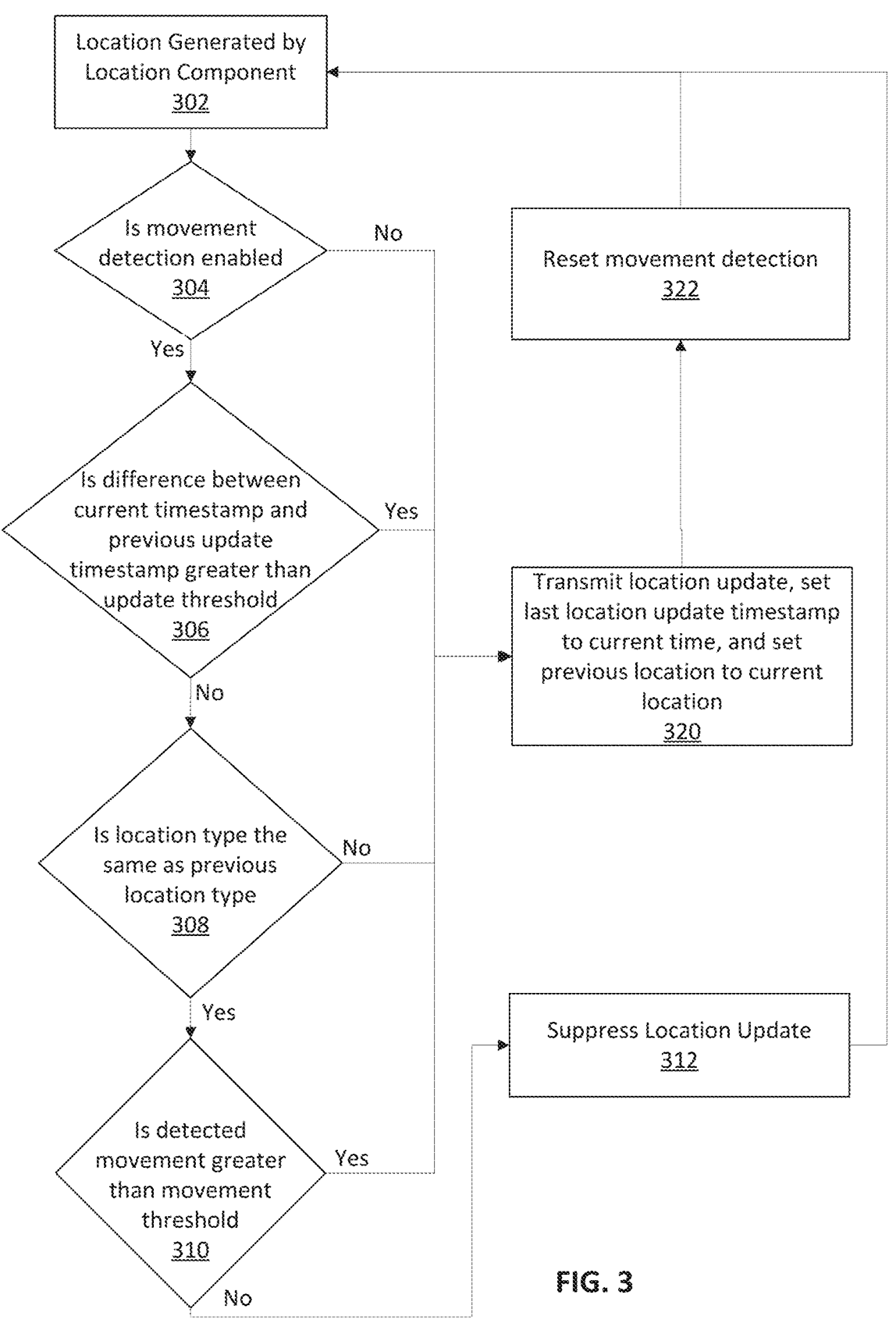
FIG. 3 is a flow chart of a method for determining whether location updates are to be managed and/or transmitted by an electronic device according to various aspects of the present disclosure.

In various embodiments, and with reference to FIG. 3, a method for managing location updates by a field device is disclosed. The method for managing location updates may be similar to, or have similar aspects and/or components with, any update management method discussed herein. As noted above, the method for managing location updates by the field device may be managed, updated, and/or altered by a state management server (e.g., central server 102, state management server 102, state management server 208, etc.)

Further, the method may be altered for use by internally powered devices and/or externally powered devices. Additionally, it should be noted that determinations made by the field device may be associated with a set of internal criteria that form a decision tree, a set of thresholds, and other decision points that tailor the location update, the device information provided by the location update, and a schedule for future location updates.

In various embodiments, field devices may comprise a location component that is configured to periodically, aperiodically, continuously, and/or otherwise determine a device location for a field device. For example, the location component may be activated by a processing circuit of the field device in response to a period of time elapsing, a detected event occurring, and/or a determination that a condition is satisfied. In response to the location component being activated, at step 302, the processing circuit may receive a location generated by the location component.

In various embodiments, the location component may use a variety of methods to determine the location of the field device at step 302. For example, the location component may be configured to utilize various satellite-based positioning systems (e.g., Global Navigation Satellite System, Global Positioning System, consumer satellite arrays, etc.). In some alternative and/or additional examples, the location component may be configured to utilize various network-based positioning systems (e.g., Wi-Fi Positioning System, Location Area Information from telecommunication networks, etc.). Additionally, the location component may be configured to switch between location determining methods based at least on availability, preference configuration, location accuracy associated with the location determining methods, location precision associated with the location determining methods, and/or other considerations. It should be noted that the location component may use substantially any location methodology for the field device.

In various embodiments, and at step 304, the processing circuit of the field device may determine whether movement detection is available for evaluation via the set of internal criteria. In particular, movement detection may be an optional consideration for whether a location update is to be transmitted from a field device to the state management server. Where movement detection is not available, the processing circuit may bypass later steps in the method and proceed to transmitting the location update at step 320. Where movement detection is available, the processing circuit may proceed to step 306. The indication of whether movement detection is available may be an option in a field device configuration that is toggleable.

In various embodiments, and at step 304 the processing circuit of the field device may be configured to determine whether movement detection is available for the location update based at least on a set of internal criteria. In particular, the set of internal criteria of the field device may cause the processing circuit to determine whether one or more field device conditions enable movement detection and/or bypass utilization of movement detection during generation of a location update. For example, the set of internal criteria may cause the processing circuit to bypass movement detection (e.g., make movement detection unavailable) while the field device is recording data, transmitting data, live streaming to a central server, and/or otherwise in an energy consuming device state.

In various embodiments, and at step 306, the processing circuit of the field device may determine whether an amount of time between a previous update and a current time satisfies one or more duration thresholds. In particular, the processing circuit may determine whether a difference between current timestamp and previous update timestamp greater than an update threshold. Alternatively, or in addition, the processing circuit may determine whether the difference between the current timestamp and the previous update timestamp is greater than one or more update thresholds. For example, a first update threshold may be associated with a minimum period of time between location update transmissions. Additionally, a second update threshold may be associated with an upper limit period of time between location update transmissions (e.g., once the second update threshold is satisfied, a location update may be transmitted independent of other criteria associated with the field device). It should be noted that any number of update thresholds may be utilized to distinguish between subsets of the internal criteria utilized by the field device (e.g., a first update threshold may cause the processing circuit to utilize a first subset of criteria and a second update threshold may cause the processing circuit to utilize a second subset of criteria).

At step 306, the processing circuit of the field device may acquire the previous update timestamp and a current timestamp. Generally, the field device may store the previous update timestamp in response to a previous location update being transmitted to the state management server. More specifically, when the processing circuit of the field device determines that the previous location update is to be sent, the processing circuit may cause the previous update timestamp to be generated and stored in memory of the field device. Similarly, when the processing circuit receives the location of the field device from the location component, the processing circuit may cause the current timestamp to be generated and compared with the previous update timestamp. Accordingly, the processing circuit may be configured to determine a period of time that elapsed between the previous update timestamp and the current timestamp. Further, the period of time between the previous update timestamp and the current timestamp may be utilized in determining whether the one or more duration thresholds are satisfied.

In various embodiments, the processing circuit of the field device may be configured to acquire and store previous update attempt timestamps that are associated with suppressed location updates. In particular, the processing circuit may store a previous update attempt timestamp in response to a previous location update attempt being suppressed by the processing circuit. The previous location update attempt may be suppressed in response to an evaluation of the evaluation via the set of internal criteria. While the processing circuit may have determined that the previous location update attempt was suppressed, the period of time that elapsed between the previous location update attempt and the current timestamp may be considered for determining the subset of internal criteria utilized for a current location update attempt.

In various embodiments, and at step 308, the processing circuit of the field device may determine whether a location type associated with the location generated by the location component matches a previous location type associated with the previous location update. In particular, locations generated by the location component may be associated with a location type that indicates a method of determining the location. As noted above, the location component may be configured to utilize one or more methods of location determination (e.g., satellite-based positioning, network-based positioning, etc.). Additionally, the location component may be configured to switch between the one or more methods of location determination based at least on location accuracy, location precision, battery consumption, and/or other preferences associated with individual location determination methods. Accordingly, two locations determined by the location component may be determined via different location determination methods.

At step 308, the processing circuit may utilize the set of internal criteria to determine whether the location type associated with the location triggers the location update to be transmitted. In particular, the set of internal criteria may include one or more triggers that cause the location update to be transmitted to the state management server where the previous location update is associated with a first location type different from a second location type associated with the location update. For example, the previous location update may be associated with a previous device location determined via a network-based positioning system and the location update may be associated with a device location determined by a satellite-based positioning system. In response to identifying that the field device has switched location determining methods, the set of internal criteria may cause the processing circuit to determine that the location update is to be transmitted. It should be noted that while location type may reference the location determining method associated with the device location and/or previous device location, location type may be associated with the location accuracy, location precision, and/or other considerations associated with the location type.

In various embodiments, and at step 310, the processing circuit of the field device may determine whether detected movement associated with the field device satisfies a movement threshold associated with the set of internal criteria. In particular, the set of internal criteria may comprise a movement threshold that indicates a difference between a first position and a second position of the field device that may trigger a location update to be transmitted to the state management server. It should be noted that the difference between the first position and the second position may be associated with a period of time such that the movement threshold is a velocity. Additionally, the difference between the first position and the second position may be determined to satisfy the movement threshold (e.g., movement threshold is associated with a distance). Further, the difference between the first position and the second position may be associated with an acceleration that satisfies the movement threshold.

In various embodiments, and at step 310, the processing circuit of the field device may access a previous field device location associated with a previous location update. Additionally, the processing circuit may determine, based at least on the previous field device location and a current device location, a travel distance and/or a device velocity that the field device traveled between a previous update timestamp and a current timestamp. The travel distance and/or the device velocity may be compared against the movement threshold associated with the set of internal criteria. It should be noted that a range of travel distances and/or device velocities that satisfy the movement threshold may be adjusted depending at least on the set of internal criteria satisfied for steps 304, 306, and 308.

In various embodiments, and at step 312 the processing circuit may determine that a location update will be suppressed based at least on the set of device conditions (e.g., difference between current timestamp and previous update timestamp, location type differences, travel distance, device velocity, device acceleration, etc.) and the set of internal criteria. In particular, the processing circuit may determine that a location update is to be delayed, rescheduled, withheld, not transmitted, deleted, and/or otherwise suppressed such that the state management server does not receive the location update.

In various embodiments, and at step 312, the processing circuit may determine that one or more future location updates will be suppressed based at least on the set of device conditions and the set of internal criteria. In particular, the processing circuit may determine that one or more of steps 304, 306, 308, and 310 have been evaluated such that the one or more future updates may be suppressed from transmission to the state management server. For example, the processing server may determine that the period time between the previous update timestamp and the current timestamp does not trigger the location update to be transmitted, the location update and the previous location update share a location type, and that the travel distance of the field device. The combination of the above determinations may cause the processing circuit of the field device to determine that the field device is substantially stationary. Additionally, the processing circuit may modify the update schedule for one or more future location updates to create a revised update schedule. The revised update schedule may be associated with a first period of time between the one or more future updates that is greater than a second period of time associated with the update schedule. Further, the field device may transmit the revised update schedule to the state management server and notify the state management server that one or more location updates associated with the update schedule may be suppressed by the field device and that the one or more future updates are scheduled for transmission according to the revised update schedule.

In various embodiments, and at step 312, the processing circuit may determine an upcoming timestamp for an upcoming location update based at least on the set of device conditions and the set of internal criteria. In particular, the processing circuit may determine that one or more of steps 304, 306, 308, and 310 have been evaluated such that the upcoming timestamp for the upcoming location update is to be modified. For example, the upcoming location update may be associated with a first upcoming timestamp that indicates that the field device is scheduled transmit the upcoming location update after a first period of time from a location update. In response to determining that the set of internal criteria indicate that the upcoming timestamp associated with the upcoming location update is to be modified, the processing circuit may modify the upcoming timestamp from the first upcoming timestamp to a second upcoming timestamp. The second upcoming timestamp may indicate that the field device is scheduled to transmit the upcoming location update after a second period time from the location update greater than the first period of time. The modified upcoming timestamp (e.g., the second upcoming timestamp associated with the second period of time) may be transmitted from the field device to the state management server with the location update. Accordingly, the state management server may update the upcoming timestamp to reflect the second period of time from receipt of the location update that the upcoming location update is scheduled to be received.

In at least one embodiment, and at step 312, the processing circuit may determine that the location update generated by the field device may be suppressed from transmission to the state management server. In particular, the set of internal criteria may cause the processing device to substantially prevent a location update from being transmitted to the state management server at the current timestamp. For example, the location update may be an optional location update that may be suppressed as a revised update schedule associated with a previous location update indicates to the state management server that the location update may be suppressed at the current timestamp. Alternatively, or in addition, the location update may be associated with a current timestamp where the state management server expects the location update to be transmitted. Further, the processing circuit may determine that the set of internal criteria satisfied by the set of device conditions indicates that the location update is to be suppressed at the current timestamp. Additionally, the processing circuit may determine an upcoming timestamp where an upcoming location update is to be transmitted to the state management server.

In various embodiments, and at step 320, the processing circuit may determine that the location update is to be transmitted to the state management server. In particular, the set of internal criteria may result in the processing circuit determining that the location update is to be transmitted at the current timestamp. Transmission of the location update may trigger a previous location update to be replaced by the location update being transmitted at the current timestamp. Replacement of the previous location update by the location update may enable a subsequent location update to utilize the location update associated with the current timestamp as the previous location update at a subsequent timestamp.

In various embodiments, and at step 320, the set of internal criteria may cause the processing circuit to transmit the location update to the state management server. Additionally, the set of internal criteria may cause the processing circuit to transmit the update schedule to the state management server to confirm that one or more future location updates are scheduled for transmission according to the update schedule. For example, and in response to determining that the location update is to be transmitted to the state management server, the processing circuit may generate the location update from the set of device conditions and the update schedule. The location update may comprise one or more indications of device state associated with the set of device conditions, the set of device conditions, one or more indications of thresholds satisfied by the set of device conditions (e.g., duration threshold, movement threshold, etc.), and/or other device information that the state management server may utilize to determine the device state.

In various embodiments, the processing circuit may proceed to step 320 in response to one or more determinations. In particular, the processing circuit may proceed to transmitting the location update at step 320 in response to determining that one or more thresholds are satisfied such that the set of internal criteria indicate that the location update is to be transmitted to the state management server. For example, one or more determinations that movement detection is not enabled, that the period time between a previous update timestamp and the current timestamp satisfies a duration threshold, that a previous location update and the location update are associated with a first location type and a second location type, that a travel distance satisfies a movement threshold, and/or other determinations completed by the processing circuit. It should be noted that the set of internal criteria may be configured to cause the processing circuit to transmit the update in response a determination that a threshold is satisfied by the set of device conditions and/or a combination of thresholds being satisfied.

In various embodiments, and in response to the location update being transmitted, the processing circuit may store the location update as a previous location update. In particular, transmission of the location update may cause the processing circuit to utilize the location update as the previous location update (e.g., a previous update timestamp, a previous update location, a set of previous device conditions, etc.) for one or more subsequent location updates. The processing circuit may store the current timestamp, the current device location, and other device information associated with the location update as the previous update timestamp, the previous device location, and other previous device information for reference in subsequent movement detection evaluations by the processing circuit.

In various embodiments, and at step 322, the processing circuit may reset the movement detection evaluation. In particular, and independent of whether the location update was transmitted to the state management server, the processing circuit may proceed to step 302 and continue evaluation whether one or more subsequent location updates are to be transmitted once the evaluation of the location update has complete step 312 or step 320.

Figure 4:
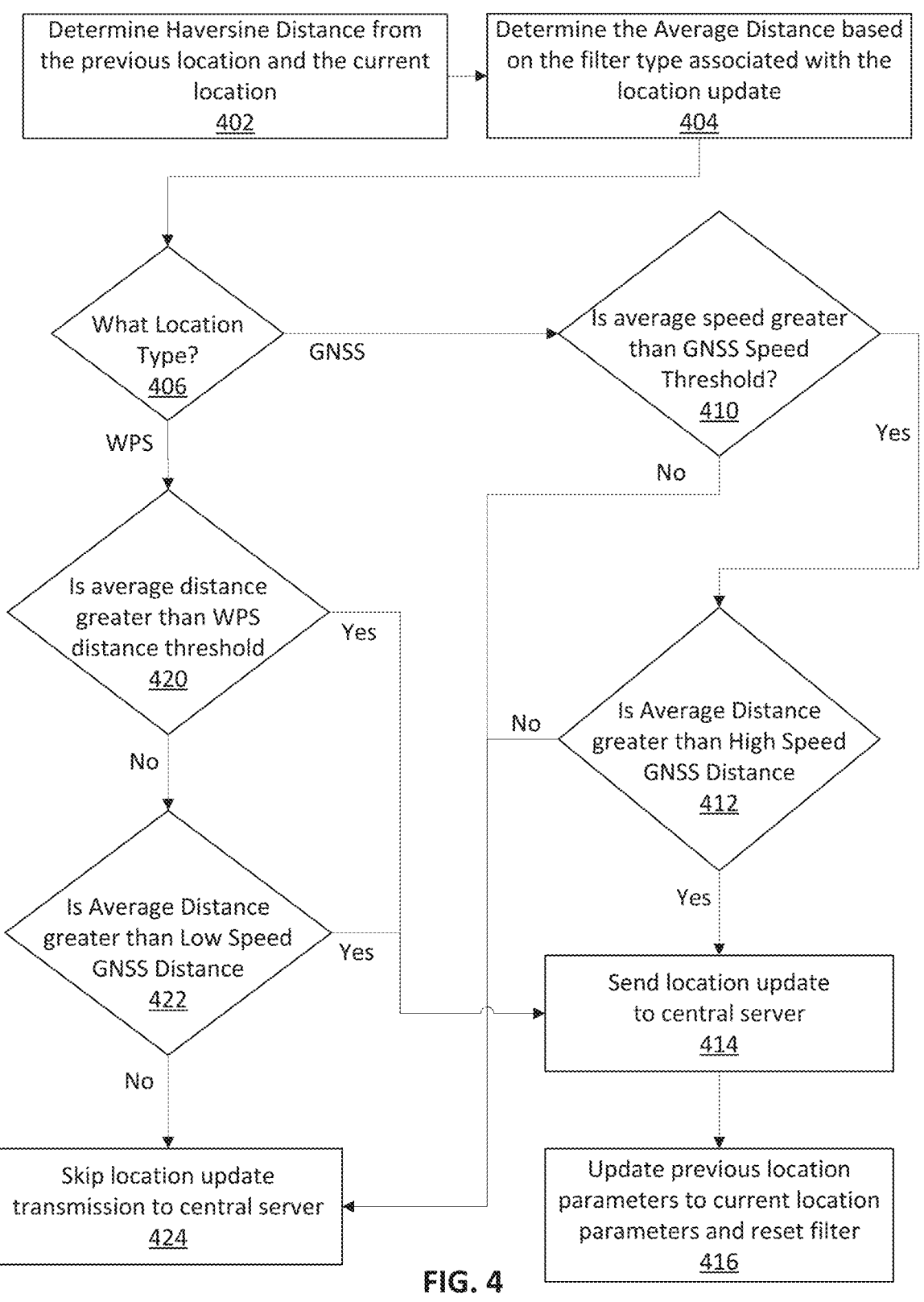
FIG. 4 is a flow chart of an additional method for determining whether location updates are to be managed and/or transmitted by an electronic device according to various aspects of the present disclosure.

In various embodiments, and with reference to FIG. 4, a method for evaluating a location update by a field device is disclosed. The method for managing location updates may be similar to, or have similar aspects and/or components with, any update management method discussed herein. As noted above, the method for managing location updates by the field device may be managed, updated, and/or altered by a state management server (e.g., central server 102, state management server 102, state management server 208, etc.) Further, the method may be modified for use by internally powered devices and/or externally powered devices. Additionally, it should be noted that determinations made by the field device may be associated with a set of internal criteria that form a decision tree, a set of thresholds, and other decision points that tailor the location update, the set of device conditions included in the location update, the device information provided by the location update, and a schedule for future location updates. It should be noted that the method of FIG. 4 may be executed independent of the method of FIG. 3 and/or as further determinations completed by the processing circuit of the field device at various steps of FIG. 3.

At step 402 (an optionally following step 302), the processing circuit of the field device may be configured to determine a distance between a previous update location and a current device location. It should be noted that a variety of distance determining methods may be utilized. For example, the processing circuit may be configured to calculate a Haversine distance (e.g., the shortest distance between two points along a spherical surface), a linear distance (e.g., the shortest distance between two points), a path distance (e.g., distance along a route and/or path taken by the field device), and/or other representation of a distance traveled by the field device between the previous update location and the current location. Additionally, the distance determining method utilized by the processing circuit of the field device may be indicated by the set of internal criteria, a field device configuration, and/or other indication of distance determining method. It should be noted that for the purpose of FIG. 4, the travel distance may be referenced as the Haversine distance.

At step 404, the processing circuit of the field device may be configured to utilize a measurement filter to determine an average distance from the Haversine distance. In particular, a measurement filter may be utilized to manage random variations in location determining method output and to mitigate potential outlier location measurements. The processing circuit may utilize one or more filters to determine the average distance for the Haversine distance. For example, the processing circuit may determine a moving window average of the Haversine distance, wherein the moving window is a set of Haversine distance measurements (e.g., 2 measurements, 3 measurements, 5 measurements, 10 measurements, etc.) that are averaged together (e.g., mean average, median average, etc.) to determine the average distance. Alternatively, or in addition, the processing circuit may determine an exponential moving average that utilizes a greater weight and significance on the most recent data points to determine the average distance. Alternatively, or in addition, the processing circuit may utilize location coordinates associated with one or more previous update locations to determine a weighted average of received coordinates. The weighted average of received coordinates for the previous update locations may be utilized to determine the average distance (or the Haversine distance) with the current location of the field device.

At step 404, the processing circuit of the field device may determine additional location information associated with the Haversine distance and/or the average distance. In particular, the processing circuit may further determine a field device velocity (e.g., a velocity associated with the field device at the current location), an average field device velocity between the previous update location (or the weighted average of received coordinates) and the current location, a field device acceleration, a field device average acceleration, and/or other movement information associated with the field device location. It should be noted that the processing circuit of the field device may determine the movement information and/or location information from one or more device locations determined by a location component of the field device (e.g., a component configured to utilized satellite-based, network-based, and/or other location determining methods). Alternatively, or in addition, the field device may comprise an accelerometer, a gyroscope, and/or other instruments to determine movement information and/or location information associated with the field device.

At step 406, the processing circuit of the field device may determine the location determining method utilized to generate the device location associated with the current timestamp. It should be noted that subsequent steps of FIG. 4 may be bypassed if the processing circuit determines different location determining methods were utilized at step 308. For example, a field device may be configured to utilize a global navigation satellite system (GNSS) and/or a Wi-Fi positioning system (WPS) for determining the device location. Alternatively, or in addition, the field device may be configured to utilize other satellite-based and/or network-based location determining methods. Additionally, the set of internal criteria associated with the field device may be configured such that the processing circuit prioritizes a first location determining method (e.g., GNSS) over a second determining method (e.g., WPS) if both location determining methods are available. Alternatively, or in addition, the set of interna criteria associated with the field device may be configure such that the processing circuit elects to utilize the location determining method associated with the previous location update(s). Further, the set of internal criteria associated with the field device may be configured such that the processing circuit utilizes one or more of the available location determining methods for generating the average distance and/or the Haversine distance. Accordingly, the processing circuit may utilize a first subset of internal criteria, a second subset of internal criteria, and/or an additional subset of internal criteria for determining whether the location update is to be transmitted based at least on the location determining methods associated with the device location at the current timestamp.

At step 406, the processing circuit may elect to utilize a first subset of internal criteria (e.g., steps 410 and 412) in response to determining that the device location at the current location was generated via GNSS. At step 406, the processing circuit may elect to utilize a second subset of internal criteria (e.g., steps 420 and 422) in response to determining that the device location at the current location was generated via WPS.

At step 410, the processing circuit may determine whether a device velocity associated with the field device satisfies a GNSS speed threshold. The processing circuit may utilize an average velocity of the field device over the average distance (or Haversine distance), a current velocity of the field device at the device location, and/or other velocity associated with the field device. In response to the processing circuit determining that the device velocity exceeds the GNSS speed threshold, the processing circuit may proceed to step 412. Alternatively, the processing circuit may determine that the device velocity is less than the GNSS speed velocity and proceed to step 424. It should be noted that, based at least on the configuration of the GNSS speed threshold, satisfying the GNSS speed threshold may reference either proceeding to step 412 and/or step 424. For example, where the GNSS speed threshold is evaluating whether the device velocity is less than or equal to the GNSS speed threshold, satisfying the GNSS speed threshold may cause the processing circuit to proceed to step 424. Where the GNSS speed threshold is evaluating whether the device velocity is greater than or equal to the GNSS speed threshold, satisfying the GNSS speed threshold may cause the processing circuit to proceed to step 412.

At step 412, the processing circuit may determine whether the average distance and/or the Haversine distance satisfies a high speed GNSS distance threshold. In response to determining that the average distance (and/or Haversine distance) exceeds the high speed GNSS distance threshold, the processing circuit may proceed to step 414. Alternatively, the processing circuit may proceed to step 424 where the average distance (and/or Haversine distance) is less than the high speed GNSS distance threshold.

In response to the processing circuit determining that the device velocity satisfies the GNSS speed velocity and/or the average distance satisfies the high speed GNSS distance threshold, the processing circuit may proceed to steps 414 and 416. Step 414 may comprise substantially similar actions to step 320. The processing circuit, at step 414, may generate a location update from the set of device conditions at the current timestamp and an update schedule for transmission to the state management server. Generally, the processing circuit may generate an update schedule to inform the state management server of one or more upcoming timestamps that one or more upcoming location updates are schedule for transmission to the state management server. It should be noted that the update schedule may match a state management server update schedule where the field device was associated with an active state, a moving state, and/or other dynamic field device state. Alternatively, the update schedule may be a revised update schedule that is incorporated into the state management server update schedule where the field device was associated with an inactive state, a stationary state, and/or other static field device state by a previous location update. Further, the update schedule may indicate one or more periods of time between the one or more upcoming location updates and/or one or more transmission timestamps associated with the one or more upcoming location updates.

At step 416, the processing circuit may update the previous location update parameters and reset the filters for determining the average distance. Step 416 may comprise substantially similar actions as step 320. The processing circuit, at step 416, may store the location update as a previous location update for the purpose of the one or more upcoming location updates. Additionally, the field device location, device velocity, and other information may be utilized in generating the filter for determining the average distance for the one or more upcoming location updates.

At step 420, and continuing from step 406, the processing circuit may determine whether the average distance and/or the Haversine distance satisfies a WPS distance threshold. In particular, the set of internal criteria may utilize different determinations for evaluating the device location obtained from WPS than GNSS and/or other location determining methods. The different determinations may be utilized due to different location accuracy, location precision, and/or other considerations associated with the location determining method. In response to determining that the average distance (and/or Haversine distance) is greater than the WPS distance threshold, the processing circuit may proceed to step 414. Alternatively, the processing circuit may proceed to step 422 where the average distance (and/or Haversine distance) is less than WPS distance threshold.

At step 422, the processing circuit may determine whether the average distance and/or the Haversine distance satisfies a low speed GNSS distance threshold. In response to determining that the average distance (and/or Haversine distance) exceeds the low speed GNSS distance threshold, the processing circuit may proceed to step 414. Alternatively, the processing circuit may proceed to step 424 where the average distance (and/or Haversine distance) is less than the low speed GNSS distance threshold. It should be noted that the low speed GNSS distance threshold may be associated with a minimum travel distance that causes the processing circuit to transmit the location update to the state management server based at least on low location accuracy, low location precision, reduced location determining method availability, and/or other considerations.

At step 424, the processing circuit may determine that one or more location updates are to be skipped and/or suppressed from transmission to the state management server. It should be noted that step 424 may comprise substantially similar actions as step 312. Generally, the processing circuit may determine that the location update is to be suppressed where a previous update schedule indicates that the location update is an optional location update. Additionally, the processing circuit may determine that one or more upcoming location updates are to be suppressed and generate a revised update schedule for transmission to the state management server to indicate the one or more suppressed location updates. Accordingly, the processing circuit may determine that one or more location updates are to be suppressed from transmission to the state management server and transmit the revised update schedule to the state management server with the location update.

Figure 5:
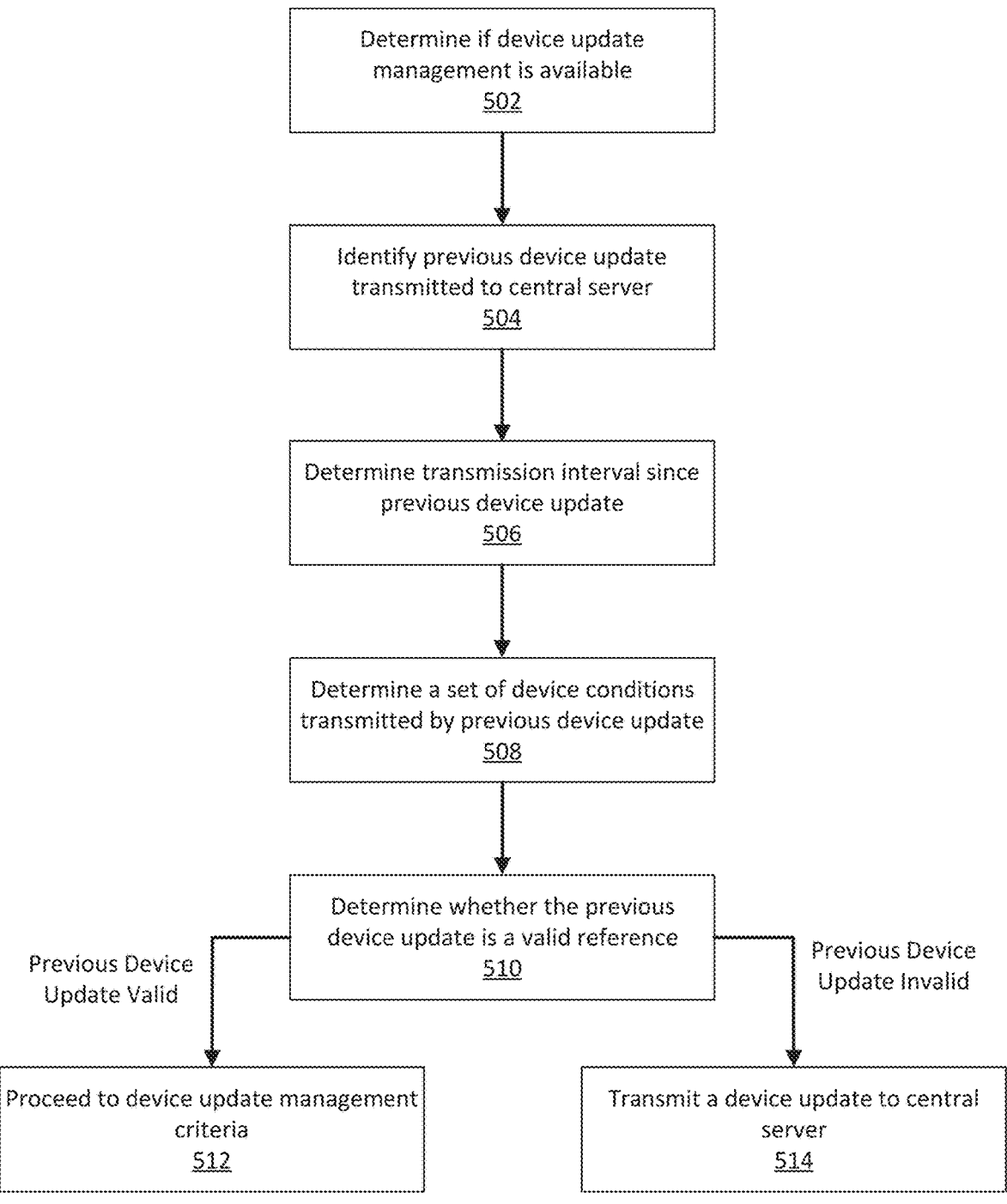
FIG. 5 is a flow chart of a method for evaluating criteria regarding an electronic device providing location updates to a central server according to various aspects of the present disclosure.

In various embodiments, and with reference to FIG. 5, a method for evaluating a device update by a field device is disclosed. The method for managing device updates may be similar to, or have similar aspects and/or components with, any update management method discussed herein. As noted above, the method for managing device updates by the field device may be managed, updated, and/or altered by a state management server (e.g., central server 102, state management server 102, state management server 208, etc.) Further, the method may be modified for use by internally powered devices and/or externally powered devices. Additionally, it should be noted that determinations made by the field device may be associated with a set of internal criteria that form a decision tree, a set of thresholds, and other decision points that tailor the device update, the set of device conditions included in the device update, the device information provided by the location update, and a schedule for future location updates.

At step 502, the processing circuit may determine whether device update management is available for the field device. In particular, the processing circuit of a field device may be configured to periodically, aperiodically, continuously, and/or otherwise determine whether a device update is to be generated for and transmitted from the field device. For example, the processing circuit may initiate evaluation of the device update in response to a period of time elapsing, a detected event occurring, and/or a determination that a threshold associated with a set of internal criteria is satisfied. Additionally, the processing circuit may determine whether a field device configuration permits device update management in response to the period of time elapsing, the detected event occurring, and/or other determinations of the processing circuit. Further, the processing circuit may determine whether device update management is available based at least on an update schedule associated with the field device and the state management server that identifies a set of timestamps that the field device transmits a set of device updates to the state management server. Alternatively, or in addition, the processing circuit may determine whether device update management is available on a periodic basis that may be adjusted by the field device in response to a set of device conditions.

At step 504, the processing circuit may identify a previous device update transmitted to a central server and/or a state management server. In particular, the processing circuit may have saved, stored, and/or otherwise preserved the previous device update that the field device transmitted to the state management server in a memory component associated with the processing circuit. Additionally, the processing circuit may identify one or more previous device updates transmitted to the state management server. Individual previous device updates may be associated with previous update timestamps associated with the transmission of the previous device updates, previous device conditions communicated by the previous device updates to the state management server, and/or other information associated with the previous device updates.

Alternatively, or in addition, the processing circuit may determine, at step 504, that the device update is an initial device update that occurs after transmission of an initialization indication from the field device to the state management server. For example, the field device may be assigned to, picked up by, and/or otherwise associated with a field user that turns on, activates, and/or otherwise enables the field device. In response to the field device being enabled, the field device may transmit the initialization indication to the state management server to inform the state management server that the field device is associated with and utilized by the field user. Accordingly, the initialization indication may cause the processing circuit to proceed to step 514.

At step 506, the processing circuit may determine a transmission interval since previous device update was transmitted to the state management server. In various embodiments, the processing circuit of the field device may determine an amount of time that has elapsed between a previous update timestamp and a current timestamp. Generally, the processing circuit of the field device may acquire the previous update timestamp from a memory component of the field device and a current timestamp. Additionally, the field device may store the previous update timestamp in response to a previous location update being transmitted to the state management server. For example, when the processing circuit of the field device determines that the previous location update is to be sent, the processing circuit may cause the previous update timestamp to be generated and stored in memory of the field device. Similarly, when the processing circuit initiates the evaluation of the device update, the processing circuit may cause the current timestamp to be generated. Accordingly, the processing circuit may be configured to determine a period of time that elapsed between the previous update timestamp and the current timestamp. Further, the period of time between the previous update timestamp and the current timestamp may be utilized in determining whether the one or more duration thresholds are satisfied.

At step 508, the processing circuit may determine a set of previous device conditions transmitted by the previous device update to the state management server. Similar to the previous update timestamp, the processing circuit of the field device may determine one or more previous device conditions for comparison against one or more device conditions associated with the current timestamp. Device conditions may include a field device location, a field device velocity, a field device signal strength, a field device network, a recording status associated with the field device, a live-stream availability associated with the field device, and/or other device condition. Additionally, the one or more previous device conditions may be stored in a memory component of the field device in response to the processing circuit determining that the previous device update was to be transmitted to the state management server. Further, the one or more device conditions may be determined by the processing circuit at the current time based at least on the processing circuit initiating evaluation of the device update.

At step 510, the processing circuit may determine whether the previous device update is a valid reference. In various embodiments, the processing circuit may be configured to utilize a set of internal criteria for evaluating whether the previous device update is a valid reference for the device update. In response to determining that the previous device update is a valid reference, the processing circuit may proceed to step 512. Alternatively, in response to determining that the previous device update is an invalid reference, the processing circuit may proceed to step 514.

In various embodiments, a first internal criterion may be associated with a duration threshold associated with the period of time that elapsed between the previous update timestamp and the current timestamp. Additionally, the processing circuit may determine whether a difference between current timestamp and previous update timestamp is greater than an update threshold. Alternatively, or in addition, the processing circuit may determine whether the difference between the current timestamp and the previous update timestamp is greater than one or more update thresholds. For example, a first update threshold may be associated with a minimum period of time, a default period time, and/or other period of time that may be unassociated with one or more scheduled device updates. Additionally, a second update threshold may be associated with an upper limit period of time, a period of time between scheduled updates, and/or other adjusted period of time determined by the field device in association with the previous device update. In at least some embodiments, once the second update threshold is satisfied, the device update may be transmitted independent of other criteria associated with the field device. It should be noted that any number of update thresholds may be utilized to distinguish between and cause the processing circuit to utilize individual subsets of the internal criteria (e.g., a first update threshold may cause the processing circuit to utilize a first subset of criteria and a second update threshold may cause the processing circuit to utilize a second subset of criteria).

In various embodiments, a second internal criterion may be associated with a device condition threshold. For example, and as noted above, device conditions may comprise the field device location, the field device velocity, the field device signal strength, the field device network, the recording status associated with the field device, the live-stream availability associated with the field device, and/or other device conditions. Individual device conditions may be associated with device condition threshold(s) that tie threshold values of device conditions to different responses by the field device. For example, field device signal strengths above a signal strength threshold may distinguish between valid and invalid references such that a signal strength difference between the previous device update and the device update less than the signal strength threshold qualifies the previous device update as a valid reference. Alternatively, or in addition, where the recording status of the field device associated with the previous device update and the device update is active, a recording status threshold may indicate that the previous device update is a valid reference. Accordingly, the processing circuit may determine whether the previous device update is a valid reference based at least on the set of device conditions and the set of internal criteria.

At step 512, the processing circuit may determine that the previous device update is a valid reference and proceed to evaluating device update management criteria for the device update.

At step 514, the processing circuit may determine that the previous device update is an invalid reference and transmit a device update to the state management server. Additionally, a determination that the previous device update is an invalid reference may cause the processing circuit to generate an update schedule and transmit the update schedule with the device update.

In various embodiments, and with reference to FIG. 6, a method for evaluating a device update and generating the device by a field device is disclosed. The method for managing device updates may be similar to, or have similar aspects and/or components with, any update management method discussed herein. As noted above, the method for managing device updates by the field device may be managed, updated, and/or altered by a state management server (e.g., central server 102, state management server 102, state management server 208, etc.) Further, the method may be modified for use by internally powered devices and/or externally powered devices. Additionally, it should be noted that determinations made by the field device may be associated with a set of internal criteria that form a decision tree, a set of thresholds, and other decision points that tailor the device update, the set of device conditions included in the device update, the device information provided by the location update, and a schedule for future location updates.

At step 602, the processing circuit may determine that a device update is available to be transmitted to central server. In various embodiments, the processing circuit may determine that an update schedule indicates that the device update is available to be transmitted at a current timestamp. Alternatively, or in addition, the processing circuit may determine that a period of time has elapsed that provides an opportunity to transmit the device update at the current timestamp. It should be noted that where the update schedule indicates that the device update is available to be transmitted, the device update may be considered a scheduled device update. Alternatively, or in addition, the device update that is potentially triggered by the period of time elapsing may be considered a suppressible and/or optional device update.

In various embodiments, one or more scheduled device updates may be one or more device updates that are expected by a state management server and are transmitted at the current timestamp. Additionally, evaluation of the device update against the set of internal criteria and the processing circuit determines whether the update schedule is to be revised based on a set of device conditions. Alternatively, or in addition, the scheduled device update may be suppressed in response to a subset of internal criteria authorized to suppress a schedule device update. For example, where a battery life of the field device is at minimal power levels, a scheduled device update may be suppressed to preserve the battery life. Further, where the processing circuit determines network connectivity is absent, the scheduled device update may be preserved and transmitted when network connectively returns.

In various embodiments, suppressible device updates may be triggered by a period of time clasping (e.g., a default period of time between update timestamps, a minimum period of time between update timestamps, a heartbeat period between update timestamp, etc.), one or more field device conditions updating (e.g., network connectivity resumes, signal strength increases, alternative location determining methods become available, changes in field device movement, etc.), and/or other situations that trigger a suppressible device update (e.g., a camera of the field device is activated). Generally, suppressible device updates share similar considerations as a scheduled device update, but are not expected by the state management server. Accordingly, suppression of the suppressible device update(s) may be permitted to improve field device operation (e.g., consume battery life, preserve power for other operations, etc.), minimize network traffic for the state management server, minimize redundant information in system services associated with the state management server, and/or other benefits.

At step 604, the processing circuit may identify one or more device update filters to be utilized in activity evaluation. Generally, the processing circuit may utilize one or more device filters associated with the set of internal criteria for evaluating activity associated with the set of device conditions. For example, a field device location, a field device velocity, a field device signal strength, a field device network, a recording status associated with the field device, a live-stream availability associated with the field device, and other device conditions may be considered by the processing circuit during activity evaluation for a device update. The one or more device filters may use similar methodologies to the filters utilized to determine the average distance at step 404. Moving averages, weighting profiles, and other methods may be utilized to increase the robustness of device condition values considered by the processing circuit during evaluation of field device activity. Further, the processing circuit may perform similar actions as the processing circuit of step 404.

At step 606, the processing circuit may identify device conditions associated with the device update. Generally, the processing circuit may utilize a set of device conditions associated with the current timestamp for evaluation against the one or more device update filters and/or the set of internal criteria. Additionally, the processing circuit may record, preserve, and/or otherwise store the set of device conditions (and the associated values) in memory of the field device for transmission to the state management server and/or for utilization in update filters for one or more upcoming updates.

At step 608, the processing circuit may determine update criteria and configuration parameters for the device conditions. As previously noted, the field device may be associated with a set of internal criteria and a field device configuration. The set of internal criteria may comprise a series of threshold, decision points, and guidelines. The set of internal criteria may be utilized by the field device to determine a revised update schedule for one or more upcoming updates, the set of device conditions to be included in the device update, one or more indications of current device state (e.g., field device is stationary, field device is moving, field device is connected to a communication network, field device has poor signal strength, field device is actively recording, field device is live-streaming data, etc.), and other indications associated with the field device utilization by a field user. The set of internal criteria may comprise one or more evaluation paths that may be utilized by the processing circuit (e.g., the two paths displayed by FIG. 4.

In various embodiments, the field device configuration may provide values for various thresholds associated with the set of internal criteria (e.g., minimum travel distance, high speed GNSS distance threshold, acceleration thresholds, whether location detection is available, etc.). Additionally, the field device configuration may provide values for time periods, sampling rates, weight factors, and other parameters associated with the set of internal criteria (e.g., maximum time allowed without a location update, maximum sample duration between velocity samples, moving average window sample size, etc.).

At step 610, the processing circuit may evaluate whether the set of internal criteria permit generation of one or more device updates for the central server. As previously noted, the set of internal criteria may be associated with one or more thresholds and/or decision points that are evaluated by the processing circuit based at least on the set of device conditions. Additionally, the processing circuit may determine whether a device condition is available for evaluation based at least on the set of internal criteria and/or the field device configuration. The availability of the device condition for evaluation may be a binary indication of availability and/or a threshold statement (e.g., device condition value is less than, equal to, and/or greater than threshold value). Accordingly, the processing circuit may determine whether individual device conditions are utilized for determining whether the device update and/or one or more upcoming updates are to be suppressed by the field device.

In various embodiments, the processing circuit may determine a series of threshold statements and/or decision points from the set of internal criteria that are associated with the individual device conditions. For example, and for each device condition available for evaluation, the processing circuit may determine one or more thresholds analogous to various thresholds associated with the movement determining methods (e.g., WPS, GNSS, etc.) depicted by FIG. 4. The processing circuit may utilize the one or more thresholds for substantially any device condition similar to the various thresholds displayed by FIG. 4 for movement detection. Generally, for a device condition, the processing circuit may identify a series of decision points (e.g., step 304 of FIG. 3, step 406 of FIG. 4, etc.) and/or threshold evaluations (e.g., steps 306, 308, and 310 of FIG. 3, steps 410, 412, 420, and 422 of FIG. 4, etc.). Device condition values may be determined via the one or more device update filters determined at step 604 (e.g., travel distance between previous update and current update, signal strength difference between previous update and current update, etc.) and/or current values associated with the field device (e.g., current velocity, current acceleration, current connectivity, recording status, etc.). Accordingly, the device conditions associated with the field device may be utilized to reach a determination of whether the device update and/or the one or more upcoming updates are to be suppressed by the field device.

In various embodiments, the field device may determine that the set of internal criteria and the set of device conditions indicate that the device update and/or the one or more upcoming updates are to be suppressed. In particular, the processing circuit may determine that the set of device conditions indicate that a suppressible device update is to be suppressed from transmission to the state management server. Alternatively, or in addition, the processing circuit may determine that the set of device conditions are associated with a device state (e.g., stationary, high-signal strength, standby, etc.) that permits suppression of one or more upcoming updates. In response, the processing circuit may generate a revised update schedule based at least on an inter-update period associated with the device state. For example, a stationary field device may be configured (e.g., by the field device configuration) to utilize an update schedule of transmitted a scheduled device update every 30 seconds, 60 seconds, 120 seconds, 300 seconds, 10 minutes, 2 hours, and/or other duration associated with improving field device performance. The inter-update period associated with the stationary field device may be utilized to determine the duration between transmission of the schedule device update. Alternatively, or in addition, a moving field device may be configured (e.g., by the field device configuration) to utilize an update schedule of 1 second, 2 seconds, 5 seconds, 10 seconds, 30 seconds, and/or other duration associated with providing one or more device updates to the state management server for an active field device. The inter-update period associated with the active field device state may be utilized to determine the duration between the one or more device updates. The inter-update period associated with the field device state (e.g., a stationary field device state, an active field device state, etc.) may comprise an update frequency associated with the substantially periodic transmission of one or more device updates. Further, some device states may trigger substantially real-time and/or continuous device update transmission. Accordingly, the processing circuit may transmit the revised update schedule to the state management server with the device update.

In various embodiments, the field device may determine that the set of internal criteria and the set of device conditions indicate that the device update and/or the one or more upcoming updates will be transmitted. In particular, the processing circuit may determine that the update schedule associated with the state management server and the field device is to be maintained and utilized for the one or more upcoming updates. The update schedule may be associated with the state management server and the field device based at least on a previous update transmitted from the field device to the state management server, a default update schedule provided to the field device and the state management server, and/or other communication of the update schedule.

In various embodiments, the transmission of the device update from the field device to the state management server may cause the state management server to update internal tracking of the field device and server services to reflect the device update. In particular, the device update may communicate the revised update schedule, the update schedule, the set of device conditions, and/or other indications of device state to the state management server. In response the state management server may incorporate the revised update schedule into an internal update schedule, the set of device conditions into the field device tracking, and/or otherwise update the device state indications with the indications of device state. Further, the state management server may update a user interface to displace the device update to one or more administrative users associated with the state management server. For example, the state management server may update and/or display, via the user interface, indications of whether a selected field device is enabled, whether the field device is displayed via a map interface, one or more device identifiers, location data, movement data, location orientation data, and other field device data. Additionally, the state management server may display update schedules for the field device, a recording state, availability of field device recording, field user assignments, whether field device may stream data, and/or other field device operating information.

Figure 7:
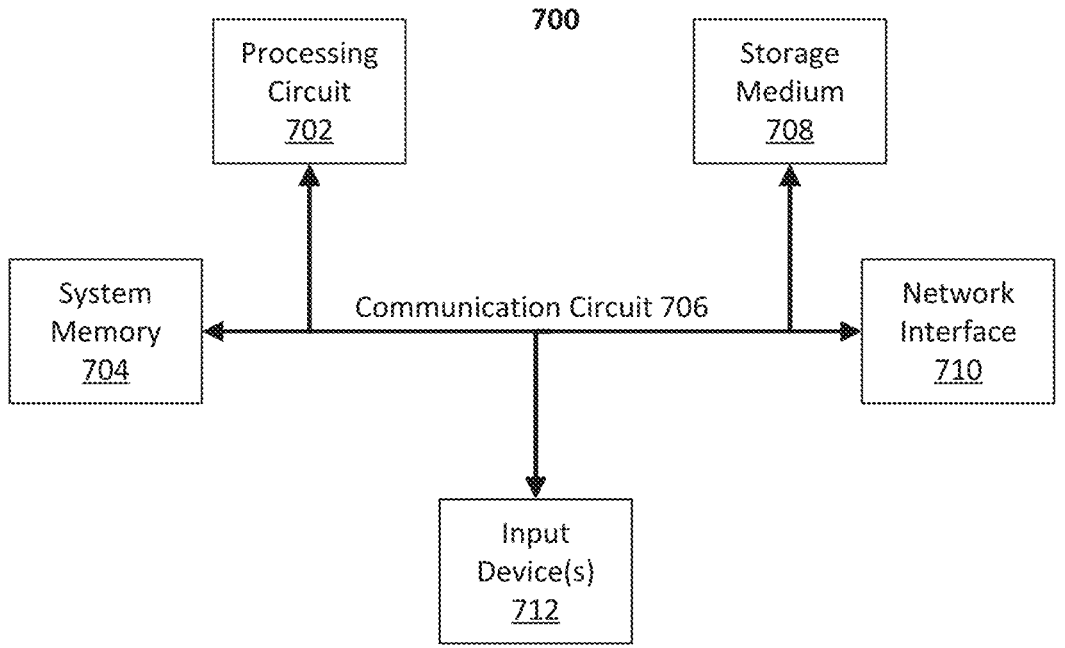
FIG. 7 is device architecture diagram according to various aspects of the present disclosure.

In various embodiments, and with reference to FIG. 7, an exemplary computer-based system 700 is disclosed. Computer-based system 700 may be appropriate for use in accordance with embodiments of the present disclosure. The accompanying description of computer-based system 700 may be applicable to servers, personal computers, mobile phones, smart phones, tablet computers, embedded computing devices, field devices, and other devices that may be used in accordance with embodiments of the present disclosure. For example, computer-based system 700 may correspond to a state management server and/or a field device based at least in part on the configuration of computer-based system 700.

Computer-based system 700 may include a processor 702 and a system memory 704 connected by a communication bus 706. Depending on the exact configuration and type of computer-based system, system memory 704 may be volatile or nonvolatile memory, such as read only memory ("ROM"), random access memory ("RAM"), EEPROM, flash memory, or other memory technology. Those of ordinary skill in the art and others will recognize that system memory 704 typically stores data and/or program modules that are immediately accessible to and/or currently being operated on by processor 702. In this regard, processor 702 may serve as a computational center of computer-based system 700 by supporting the execution of instructions. Processor 702 may comprise one or more processing units, as discussed further herein. System memory 704 may comprise one or more memory units, as discussed further herein. In embodiments, system memory may store a list of devices including entries, wherein each entry of the entries is associated with a received identifier as further discussed herein.

Computer-based system 700 may include a network interface 710 comprising one or more components for communicating with other devices and systems over a network. Embodiments of the present disclosure may access services that utilize network interface 710 to perform communications using common network protocols. Network interface 710 may comprise a communications unit, as discussed further herein.

Computer-based system 700 may also include a storage medium 708. However, services may be accessed using a computer-based system that does not include means for persisting data to a local storage medium. Therefore, storage medium 708 depicted in FIG. 7 is optional. Storage medium 708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 708 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 704 and storage medium 708 depicted in FIG. 7 are examples of computer-readable media. In embodiments, the computer-readable instructions may be executed by processor 702. When executed by the processor, the instructions may cause the processor and/or the computer-based system to perform operations. The operations may include one or more operations of one or more methods disclosed herein.

In any of the described examples, data can be captured by one or more input devices 712 for transmission, storage, and/or future processing. The processing may include encoding data streams, which can be subsequently decoded for presentation by output devices. Media data can be captured by multimedia input devices of input devices 712 and stored by saving media data streams as files on a computer-readable storage medium (e.g., in memory or persistent storage on a client device, server, administrator device, or some other device). For example, media data may be stored in storage medium 708. Input devices 712 can be separate from and communicatively coupled to computer-based system 700 (e.g., a client device), or can be integral components of computer-based system 700. In some embodiments, multiple input devices may be combined into a single, multifunction input device (e.g., a video camera with an integrated microphone). In embodiments, one or more of storage medium 708 and processing circuit 702 may implement one or more functions of a field device.

Computer-based system 700 may also include output devices such as a display, speakers, and/or any other output device described herein. The output devices may include video output devices such as a display or touchscreen. The output devices also may include audio output devices such as external speakers or earphones. The output devices can be separate from and communicatively coupled to computer-based system 700, or can be integrated components of computer-based system 700. Input functionality and output functionality may be integrated into the same input/output device (e.g., a touchscreen). Any suitable input device, output device, or combined input/output device either currently known or developed in the future may be used with described systems.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a composite device (e.g., a device having a plurality of different forms of output), and/or any other output device.

In various embodiments, one or more elements of computer-based system 700 may correspond (e.g., include, implement, perform one or more functions of, etc.) to one or more elements discussed by FIGS. 3, 4, 5, and 6. For example, processor 702 may be configured as a processing circuit. Network interface 710 may be configured as a communication circuit. Other correspondence between other elements disclosed herein may also exist, as will be appreciated by one of ordinary skill in the art.

In various embodiments, a processing circuit of a field device may perform a method comprising a series of steps. The processing circuit may determine that a period of time between an update time and a previous update time satisfies a duration threshold. Additionally, the processing circuit may determine a device location associated with the field device, the device location comprising a device position and an indication of device movement. Alternatively, or in addition, the processing circuit may determine a distance between the device location associated with the update time and a previous location associated with the previous update time. In response, the processing circuit may generate, based at least on the distance exceeding a distance threshold, a location update comprising the device location of the field device and a device state associated with the field device. Further, the processing circuit may transmit, via a communication interface connected to a communication network, the location update to a state management server. Accordingly, the processing circuit may cause the state management server to update a device status based at least on the location update transmitted by the field device, the device status associated with an update frequency and an operation status.

In various embodiments, the processing circuit may determine that an additional period of time between an additional update time and the update time satisfies the duration threshold. Additionally, the processing circuit may determine an additional device location associated with the field device and an additional distance between the additional device location associated with the additional update time and the device location associated with the update time. Further, the processing circuit may determine, based at least on the distance threshold being greater than the additional distance, to suppress an additional location update. Accordingly, the processing circuit may cause, based at least on the additional location update being suppressed, the state management server to update the device status. It should be noted that the processing circuit may revert to a standby state, an inactive state, and/or other low power state in response to determining the additional location is to be suppressed.

In various embodiments, the processing circuit may determine that an additional period of time between an additional update time and the update time satisfies the duration threshold. Additionally, the processing circuit may determine an additional device location associated with the field device and an additional distance between the additional device location associated with the additional update time and the device location associated with the update time. In response, the processing circuit may generate, based at least on the distance threshold being greater than the additional distance, an additional location update comprising a stationary device notification associated with the field device. Further the processing circuit may transmit, via the communication interface connected to the communication network, the additional location update to the state management server. Accordingly, the processing circuit may cause the state management server to update the device status based at least on the additional location update transmitted by the field device, wherein the stationary device notification causes the update frequency to be updated to a stationary update frequency and the operation status to be updated to a standby status. The additional location update may further comprise an indication that a set of location updates will be suppressed by the field device. Alternatively, or in addition, the additional location update further comprises an update timestamp associated with a scheduled location update to be transmitted by the field device.

In various embodiments, the duration threshold may be a first duration threshold configured to trigger a suppressible location update evaluation. Alternatively, or in addition, the duration threshold may be a second duration threshold, greater than the first duration threshold, that is configured to trigger a mandatory location update. Additionally, the processing circuit may determine that an additional period of time between an additional update time and the update time exceeds the second duration threshold. In response, the processing circuit may generate, based at least on the additional period of time exceeding the second duration threshold, an additional location update comprising an additional device location of the field device and an additional device state associated with the field device. Accordingly, the processing circuit may transmit, via the communication interface connected to the communication network, the additional location update to the state management server.

In various embodiments, a system may comprise a field device and a state management server. The field device may be configured to evaluate whether a location update is transmitted and generate the location update. In particular, the field device may determine a device location and a timestamp associated with the device location. Additionally, the field device may generate a location update based at least on the device location and the timestamp. Further, the field device may determine whether the location update is transmitted via a communication network to a state management server. The state management server may be configured to receive the location update from the field device and manage a device state associated with the field device. The device state may be associated with a current assignment of the field device, an activity indicator of the field device, and an update configuration of the field device. Accordingly, the state management server may update the device state based at least on the location update. In some examples, the field device may comprise a location determining component, a communication interface, one or more processing circuits, and a memory storing one or more instructions that are executable by the one or more processing circuits to perform a set of operations. Similarly, the state management server may comprise a communication interface, one or more processing circuits, and a memory storing one or more instructions that are executable by the one or more processing circuits to perform a set of operations.

In various embodiments, the update configuration of the field device comprises an update schedule that includes one or more timestamps associated with one or more scheduled updates to be received from the field device. Additionally, generating the location update based at least on the device location and the timestamp may further comprises determining a previous location associated with the field device, determining a device movement status based at least on the previous location and the device location; and determining a previous location type associated with the previous location and a location type associated with the device location. Determining whether to transmit the location update may further comprise determining a period of time that elapsed between the previous location was generated and the device location was generated and/or determining that the location update is transmitted based at least on the period of time exceeding a threshold duration. Alternatively, or in addition, determining whether to transmit the location update may further comprise determining a distance between the previous location and the device location, determining a set of distance thresholds based at least on the previous location type and the location type, and determining that the location update is transmitted based at least on the distance satisfying the set of distance thresholds. It should be noted that the set of distance thresholds may comprise a travel distance threshold and a velocity threshold. Further, determining whether the location update is transmitted may comprise determining that the device movement status indicates the field device is stationary and determining that the location update is suppressed based at least on the field device being stationary.

In various embodiments, a state management server may comprise a communication interface, one or more processing circuits, and a memory storing one or more instructions that are executable by the one or more processing circuits to perform a set of operations. In particular, the set of operations may be executed by a processing circuit of the state management server. The state management server may configure, for a field device, a set of update criteria cause the field device to generate one or more location updates. Additionally, the state update server may update the field device with the set of update criteria. In response the state management server may receive an initialize indication from the field device, the initialize indication indicating that the field device has been activated. The state management server may also receive a location update of the one or more location updates, the location update comprising a device location and a device state. The location update may cause the state management server to determine, based at least on the device location and the device state, a scheduled update and a device utilization from the set of update criteria associated with the field device. The scheduled update may further cause the state management server to update a device status with the scheduled update and the device utilization. The set of update criteria may comprise a decision tree that identifies one or more distance thresholds and one or more velocity thresholds for generation of the one or more location updates by the field device.

In various embodiments, updating the field device with the set of update criteria further comprises connecting with the field device, verifying an internal set of update criteria associated with the field device, and replacing the internal set of update criteria with the set of update criteria. Additionally, the initialize indication may indicate that the field device has been assigned to a user and has been activated for utilization by the user. Alternatively, or in addition, the initialize indication may comprise an initial location and an initial device state associated with the field device. Further, the device state may comprise a stationary device indication, a recording state indication, a connected devices indication, and an internal state indication.

In various embodiments, the scheduled update may be associated with a scheduled time that the scheduled update is received from the field device, the scheduled time determined based at least on the device state of the location update. Additionally, updating the device status with the scheduled update and the device utilization further may include displaying, via a user interface, the device status and the device utilization.

In various embodiments, a processing circuit of a field device may perform a method comprising a series of steps. The processing circuit may determine, for a field device, that a period of time between an update time and a previous update time satisfies a duration threshold. Additionally, the processing circuit may determine, based at least on the field device, a set of device conditions associated with a user utilization of the field device. The processing circuit may determine an update schedule for the field device, the update schedule determined from a set of internal criteria and the set of device conditions. In response, the processing circuit may generate, based at least on the period of time satisfying the duration threshold, a device update comprising the set of device conditions and the update schedule. Accordingly, the field device may transmit, via a communication network, the device update to a state management server. The device update may cause the state management server to update a field device state to incorporate the update schedule and the set of device conditions.

In various embodiments, the processing circuit may determine that an additional period of time between an additional update time and the update time satisfies the duration threshold. Additionally, the processing circuit may determine, based at least on the field device, an additional set of device conditions associated with the user utilization of the field device. The additional set of device conditions may be determined to satisfy an update threshold associated with the set of internal criteria. In response, the processing circuit may generate an unscheduled device update comprising the additional set of device conditions and a revised update schedule. Accordingly, the field device may transmit, via the communication network, the unscheduled device update to the state management server. The unscheduled device update may cause the state management server to update the field device state to incorporate the revised update schedule and the additional set of device conditions. It should be noted that the additional update time may occur after the update time and before a scheduled update time associated with the update schedule. Further, it should be noted that receipt of the unscheduled device update may cause the state management server to update the field device state from a standby state to an active state.

In various embodiments, the processing circuit may determine that an additional period of time between an additional update time and the update time satisfies the duration threshold. Additionally, the processing circuit may determine, based at least on the field device, an additional set of device conditions associated with the user utilization of the field device. Further, the processing circuit may determine that the additional set of device conditions satisfies an update threshold associated with the set of internal criteria. Accordingly, the processing circuit may determine, based at least on the additional set of device conditions satisfying the update threshold, that transmission of an unscheduled device update to the state management server is to be suppressed.

In various embodiments, the processing circuit may determine that an additional period of time between a scheduled update time and the update time satisfies a scheduled duration threshold. Additionally, the processing circuit may determine, based at least on the field device, an additional set of device conditions associated with the user utilization of the field device. Further, the processing circuit may determine a revised update schedule for the field device, the revised update schedule determined from the set of internal criteria and the additional set of device conditions. In response, the processing circuit may generate, based at least on the scheduled update time, a scheduled device update comprising the additional set of device conditions and the revised update schedule. The field device may transmit, via the communication network, the scheduled device update to the state management server. The schedule device update may cause the state management server to update the field device state to incorporate the revised update schedule and the additional set of device conditions. The field device state further comprises an indication of field device availability for assignment to one or more active events.

In various embodiments, a state management server may comprise a communication interface, one or more processing circuits, and a memory storing one or more instructions that are executable by the one or more processing circuits to perform a set of operations. For example, the state management server may receive an initialize indication from the field device, the initialize indication indicating that the field device has been activated. Additionally, the state management server may determine a device update schedule based at least on a field device configuration associated with the field device and the initialize indication. A field device update may be received in association with the device update schedule, the field device update comprising a set of device conditions and a revised update schedule. In response, the state management server may modify the device update schedule to incorporate the revised update schedule associated with the field device. Further, the state management server may determine, based at least on the set of device conditions, a device state associated with the field device and utilization of the field device by a field user.

In various embodiments, the update schedule may be associated with a default period of the field device configuration that triggers periodic transmission of the device update by the field device. Additionally, receiving the field device update may further comprise receiving a communication connection request from the field device at an update time associated with the device update schedule, receiving the field device update transmitted by the field device, and recording the field device update in a state management database.

In various embodiments, the initialize indication may further indicate that the field device has been assigned to a user and has been activated for utilization by the user. Additionally, the initialize indication may further comprise an initial set of device conditions associated with the field device.

Benefits, other advantages, and solutions to problems have been described herein with regard to specific embodiments. Furthermore, the connecting lines shown in the various figures contained herein are intended to represent exemplary functional relationships and/or physical couplings between the various elements. Additionally, the connecting lines shown in the various figures contained herein are intended to represent exemplary logical relationships, control relationships, and/or programmatic relationships associated with and between the various elements. It should be noted that many alternative or additional functional relationships, physical connections, logical relationships, control relationships, and/or programmatic relationships may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The foregoing description discusses various embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that is not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A method comprising:
determining, by a field device, that a period of time between an update time and a previous update time satisfies a duration threshold;
determining a device location associated with the field device, the device location comprising a device position and an indication of device movement;
determining, by the field device, a distance between the device location associated with the update time and a previous location transmitted to a state management server by the field device and associated with the previous update time;
generating, based at least on the distance exceeding a distance threshold, a location update comprising the device location of the field device and a set of device conditions associated with the field device;
transmitting, via a communication interface connected to a communication network, the location update to the state management server; and
causing the state management server to update a device state based at least on the location update transmitted by the field device, the device state associated with an update frequency and the set of device conditions.

2. The method of claim 1, further comprising:
determining, by the field device, that an additional period of time between an additional update time and the update time satisfies the duration threshold;
determining an additional device location associated with the field device;
determining, by the field device, an additional distance between the additional device location associated with the additional update time and the device location associated with the update time;
determining, based at least on the distance threshold being greater than the additional distance, to suppress an additional location update; and
causing, based at least on the additional location update being suppressed, the state management server to update the device state.

3. The method of claim 2, wherein determining to suppress the additional location update further comprises reverting to a standby state.

4. The method of claim 1, further comprising:

determining, by the field device, that an additional period of time between an additional update time and the update time satisfies the duration threshold;

determining an additional device location associated with the field device;

determining, by the field device, an additional distance between the additional device location associated with the additional update time and the device location associated with the update time;

generating, based at least on the distance threshold being greater than the additional distance, an additional location update comprising a stationary device notification associated with the field device;

transmitting, via the communication interface connected to the communication network, the additional location update to the state management server; and causing the state management server to update the device state based at least on the additional location update transmitted by the field device, wherein the stationary device notification causes the update frequency to be updated to a stationary update frequency and the field device to be associated with a standby status.

5. The method of claim 4, wherein the additional location update further comprises at least one of an indication that a set of location updates will be suppressed by the field device or an update timestamp associated with a scheduled location update to be transmitted by the field device.

6. The method of claim 1, wherein the field device is a body worn camera associated with a law enforcement officer.

7. The method of claim 1, wherein:

the duration threshold is a first duration threshold configured to trigger a suppressible location update evaluation; and a second duration threshold, greater than the first duration threshold, is configured to trigger a mandatory location update.

8. The method of claim 7, further comprising:

determining that an additional period of time between an additional update time and the update time exceeds the second duration threshold;

generating, based at least on the additional period of time exceeding the second duration threshold, an additional location update comprising an additional device location of the field device and an additional set of device conditions associated with the field device; and transmitting, via the communication interface connected to the communication network, the additional location update to the state management server.

9. A system, comprising:

a field device, the field device configured to:

determine a device location and a timestamp associated with the device location;

generate a location update based at least on the device location and the timestamp; and determine, based at least on a comparison of the location update with a previous location update, whether the location update is transmitted via a communication network to a state management server; and the state management server, the state management server configured to:

receive the location update from the field device;

manage a device state associated with the field device, the device state associated with a current assignment of the field device, an activity indicator of the field device, and an update configuration of the field device; and update the device state based at least on the location update.

10. The system of claim 9, wherein the field device comprises a location determining component configured as at least one of a global navigation satellite system and a Wi-Fi positioning system.

11. The system of claim 9, wherein the update configuration of the field device comprises an update schedule that includes one or more timestamps associated with one or more scheduled updates to be received from the field device.

12. The system of claim 9, wherein generating the location update based at least on the device location and the timestamp further comprises:

determining a previous location associated with the previous location update transmitted by the field device;

determining a device movement status based at least on the previous location and the device location; and determining a previous location type associated with the previous location and a location type associated with the device location.

13. The system of claim 12, wherein determining whether the location update is transmitted further comprises:

determining a period of time that elapsed between the previous location was generated and the device location was generated; and determining that the location update is to be transmitted based at least on the period of time exceeding a threshold duration.

14. The system of claim 12, wherein determining whether the location update is transmitted further comprises:

determining a distance between the previous location and the device location;

determining a set of distance thresholds based at least on the previous location type and the location type; and determining that the location update is transmitted based at least on the distance satisfying the set of distance thresholds.

15. The system of claim 14, wherein the set of distance thresholds comprises a travel distance threshold and a velocity threshold.

16. The system of claim 12, wherein determining whether the location update is transmitted further comprises determining that the device movement status indicates the field device is stationary and determining that the location update is suppressed based at least on the field device being stationary.

17. A method comprising:

determining, by a field device, that a period of time between an update time and a previous update time satisfies a duration threshold;

determining, by the field device, a set of device conditions associated with a user utilization of the field device;

determining, by the field device, an update schedule for the field device, the update schedule determined from a set of internal criteria and the set of device conditions;

generating, based at least on the period of time satisfying the duration threshold, a device update comprising the set of device conditions and the update schedule;

transmitting, via a communication network, the device update to a state management server; and causing, based at least on the device update, the state management server to update a field device state to incorporate the update schedule and the set of device conditions.

18. The method of claim 17, further comprising:

determining, by the field device, that an additional period of time between an additional update time and the update time satisfies the duration threshold;

determining, by the field device, an additional set of device conditions associated with the user utilization of the field device;

determining that the additional set of device conditions satisfies an update threshold associated with the set of internal criteria;

generating, by the field device, an unscheduled device update comprising the additional set of device conditions and a revised update schedule;

transmitting, via the communication network, the unscheduled device update to the state management server and causing, based at least on the unscheduled device update, the state management server to update the field device state to incorporate the revised update schedule and the additional set of device conditions.

19. The method of claim 18, wherein the additional update time occurs after the update time and before a scheduled update time associated with the update schedule and receipt of the unscheduled device update causes the state management server to update the field device state from a standby state to an active state.

20. The method of claim 18, wherein the duration threshold is associated with a default update period that triggers an evaluation of the set of device conditions and the additional set of device conditions against the set of internal criteria independent of the update schedule.

21. The method of claim 17, further comprising:

determining, by the field device, that an additional period of time between an additional update time and the update time satisfies the duration threshold;

determining, by the field device, an additional set of device conditions associated with the user utilization of the field device;

determining that the additional set of device conditions satisfies an update threshold associated with the set of internal criteria; and determining, based at least on the additional set of device conditions satisfying the update threshold, that transmission of an unscheduled device update to the state management server is to be suppressed.

22. The method of claim 17, further comprising:

determining, by the field device, that an additional period of time between a scheduled update time and the update time satisfies a scheduled duration threshold;

determining, based at least on the field device, an additional set of device conditions associated with the user utilization of the field device;

determining, by the field device, a revised update schedule for the field device, the revised update schedule determined from the set of internal criteria and the additional set of device conditions;

generating, based at least on the scheduled update time, a scheduled device update comprising the additional set of device conditions and the revised update schedule;

transmitting, via the communication network, the scheduled device update to the state management server; and causing, based at least on the scheduled device update, the state management server to update the field device state to incorporate the revised update schedule and the additional set of device conditions.

* * * * *